US008094558B2

(12) United States Patent
Takase et al.

(10) Patent No.: US 8,094,558 B2
(45) Date of Patent: Jan. 10, 2012

(54) PACKET TRANSFER APPARATUS FOR STORAGE SYSTEM

(75) Inventors: Masayuki Takase, Kokubunji (JP); Minoru Hidaka, Kunitachi (JP); Takeki Yazaki, Hachiohji (JP); Tomoyuki Oku, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1592 days.

(21) Appl. No.: 11/020,484

(22) Filed: Dec. 27, 2004

(65) Prior Publication Data

US 2006/0077915 A1  Apr. 13, 2006

(30) Foreign Application Priority Data

Oct. 8, 2004 (JP) .................................. 2004-295847

(51) Int. Cl.
*H04L 12/26* (2006.01)
(52) U.S. Cl. ........................................................ 370/235
(58) Field of Classification Search .................... None
See application file for complete search history.

(56) References Cited

U.S. PATENT DOCUMENTS

| 5,319,643 | A  | * | 6/1994 | Rao et al. .................... 370/412 |
| 6,934,296 | B2 | * | 8/2005 | Shimojo ....................... 370/428 |
| 6,987,768 | B1 | * | 1/2006 | Kojima et al. ................ 370/401 |
| 7,062,579 | B2 | * | 6/2006 | Tateyama et al. ............. 710/104 |
| 7,359,338 | B2 | * | 4/2008 | Yoshimura .................... 370/254 |
| 2002/0027907 | A1 | * | 3/2002 | Tateoka ........................ 370/389 |
| 2004/0139218 | A1 | * | 7/2004 | Matsushita et al. ........... 709/234 |
| 2004/0228311 | A1 | * | 11/2004 | Sugaya et al. ................ 370/338 |
| 2006/0123163 | A1 | * | 6/2006 | Kawanishi .................... 710/58 |
| 2006/0146780 | A1 | * | 7/2006 | Paves ........................... 370/348 |

FOREIGN PATENT DOCUMENTS

| JP | 2000-349763 | 12/2000 |
| JP | 2004-056728 | 2/2004 |

OTHER PUBLICATIONS

Takase, Masayuki et al, "Traffic Shaper Suitable for iSCSI Data Traffic", Proceedings of the 2004 IEICE Communications Society Conference Lecture Paper Archuives 2, The Institute of Electronics, Information and Communications Engineers, Sep. 8, 2004, p. 200, B-7-61.
J. Satran, et al., RFC3720—Internet Small Computer Systems Interface (refer to http://www.faqs.org/rfc3720.html), Apr. 2004.

* cited by examiner

*Primary Examiner* — Donald Mills
*Assistant Examiner* — Rhonda Murphy
(74) *Attorney, Agent, or Firm* — Antonelli, Terry, Stout & Kraus, LLP.

(57) ABSTRACT

To control a bandwidth without the need for a large-capacity buffer. This invention provides a packet transfer apparatus connected to first device and second device, with a network therebetween, including: an input unit that receives a packet from the first device; a packet storage unit that stores the packet; a packet processing unit that stores the packet in the packet storage unit; a packet checking unit that checks whether the packet is related to data request; a packet analyzing unit that analyzes the amount of data requested by the data request; a transfer control unit that controls transfer of the packet on the basis of the analyzed amount of data; and an output unit that sends the received packet to the second device.

16 Claims, 22 Drawing Sheets

| SOURCE IP ADDRESS GROUP 901 | NET MASK 902 | USER ID NUMBER 903 | CONTROL BANDWIDTH 904 |
|---|---|---|---|
| 133.144.0.0 | 255.255.0.0 | 1 | 50MB/s |
| 125.0.0.0 | 255.0.0.0 | 2 | 78MB/s |
| 120.14.33.0 | 255.255.255.0 | 3 | 60MB/s |
| 23.144.98.0 | 255.255.255.0 | 4 | 30MB/s |
| 33.184.0.0 | 255.255.0.0 | 5 | 40MB/s |

900 RD CONTROL TABLE

FIG.8

| DESTINATION IP ADDRESS GROUP 1701 | NET MASK 1702 | USER ID NUMBER 1703 | CONTROL BANDWIDTH 1704 |
|---|---|---|---|
| 133.155.0.0 | 255.255.0.0 | 11 | 50MB/s |
| 122.0.0.0 | 255.0.0.0 | 12 | 78MB/s |
| 120.16.33.0 | 255.255.255.0 | 13 | 60MB/s |
| 123.14.66.0 | 255.255.255.0 | 14 | 30MB/s |
| 133.14.0.0 | 255.255.0.0 | 15 | 40MB/s |

1700 R2T CONTROL TABLE

FIG.9

PACKET TRANSFER APPARATUS FOR STORAGE SYSTEM

CLAIM OF PRIORITY

The present application claims priority from Japanese application P2004-295847 filed on Oct. 8, 2004, the content of which is hereby incorporated by reference into this application.

BACKGROUND OF THE INVENTION

This invention relates to a packet transfer apparatus that transfers packets, and particularly to a technology for controlling a bandwidth of transferred packets.

Storage-centric network systems that store user terminals' data in storage devices at remote data centers are now attracting increasing attention. The storage-centric network systems can avoid the risk of interruption of business because they preserve data from elimination even if user terminals are broken by natural disasters, fires, enterprise terrorism, etc.

The storage-centric network systems usually communicate through the iSCSI (Internet Small Computer Systems Interface). This allows user terminals to access storage devices through IP networks. The access includes data read (RD) and data write (WR).

The iSCSI is a protocol for sending/receiving SCSI (Small Computer System Interface) commands through an IP network. The SCSI is a standard for connecting terminals such as personal computers and peripheral devices such as storage devices.

Processes performed in a storage-centric network system are now briefly described.

FIG. 24 is an explanatory diagram illustrating a read operation in a conventional storage-centric network system.

In FIG. 24, a user terminal 100 is guaranteed to use a contracted bandwidth defined by a contract with a wide area network carrier. Edge switches 103-1 and 103-2 discard packets exceeding the contracted bandwidth when detecting traffic exceeding the contracted bandwidth.

A read operation in the storage-centric network system is now described.

First, the user terminal 100 requesting a data read sends an iSCSI command RD request 200 to a storage 105. The storage 105, receiving the RD request 200, stores the corresponding RD data in an RD packet 201 and sends the packet 201 toward the user terminal 100.

However, the traffic of the sent RD data packet 201 may exceed the contracted bandwidth. Then the RD data packet 201 exceeding the contracted bandwidth is discarded on the way, e.g. by bandwidth control 203 of the edge switch 103-2.

FIG. 25 is an explanatory diagram illustrating a write operation in the conventional storage-centric network system.

The user terminal 100 requesting a data write sends an iSCSI command data WR request 300 to the storage 105. When the storage 105 receiving the WR request 300 completes preparations for the data write, the storage 105 sends an iSCSI packet R2T (Ready to Transfer) 301 to the user terminal 100. The user terminal 100, receiving the R2T 301, stores the corresponding WR data in a WR data packet 302 and sends the packet 302 toward the storage 105.

However, the traffic of the sent WR data packet 302 may exceed the contracted bandwidth. Then the WR data packet 302 exceeding the contracted bandwidth is discarded on the way, e.g. by bandwidth control 304 of the edge switch 103-1.

In this way, packets may be discarded in the storage-centric network system when the traffic becomes too high. The discarding of packets lowers the efficiency of use of the storage-centric network system and reduces throughput. Therefore the storage-centric network systems need to solve the problem of discarding packets.

A known conventional techniques for preventing discarding of packets is a technique of providing a traffic shaping unit in the packet transfer device 104 (refer to JP 2000-349763 A). The traffic shaping unit controls intervals of packet transfer to prevent traffic on the wide area network from exceeding the contracted bandwidth.

More specifically, first, the traffic shaping unit stores packets sent from the user terminal in its own packet buffer. The traffic shaping unit next measures the amount of data of packets read from the packet buffer. Then, on the basis of the measured amount of data, the traffic shaping unit provides control so that the amount of data read from the packet buffer does not exceed the contracted bandwidth.

Refer also to J. Satran, et al., RFC3720-Internet Small Computer Systems Interface (refer to http://www.faqs.org/rfcs/rfc3720.html).

SUMMARY OF THE INVENTION

According to the conventional techniques, all packets exceeding the contracted bandwidth are held in the packet buffer. Therefore the packet buffer in the traffic shaping unit requires a buffer capacity obtained by equation (1) below so that the packets will not overflow:

$$\text{Buffer capacity} = \text{the number of user terminals} \times \text{maximum window size} \quad (1)$$

The maximum window size, which is initially 64 kilobytes, can be expanded up to a maximum of 1 gigabyte through the use of a window scale option. In order to obtain enhanced throughput, the maximum window size is matched with the request RD length in RD requests.

For example, when the maximum window size is 256 kilobytes and the number of user terminals is 100, then the packet buffer needs 25.6 megabytes. An increase in the number of user terminals requires a still larger capacity packet buffer.

Providing the packet transfer device with such a larger capacity buffer increases costs and lowers extensibility.

An object of this invention is to provide a packet transfer device that does not need a large-capacity buffer.

According to an embodiment of this invention, there is provided a packet transfer device connected to first device and second device, with a network therebetween, including: an input unit that receives a packet from the first device; a packet storage unit that stores the packet; a packet processing unit that stores the packet in the packet storage unit; a packet checking unit that checks whether the packet is related to data request; a packet analyzing unit that analyzes the amount of data requested by the data request; a transfer control unit that controls transfer of the packet on the basis of the analyzed amount of data; and an output unit that sends the received packet to the second device.

According to the embodiment of this invention, the packet transfer device is capable of properly controlling a bandwidth without the need for a large-capacity buffer.

BRIEF DESCRIPTION OF THE DRAWINGS

The present invention can be appreciated by the description which follows in conjunction with the following figures, wherein:

FIG. 8 is a diagram showing the configuration of an RD control table in a packet checking unit of the first embodiment of this invention;

FIG. 9 is a diagram showing the configuration of an R2T control table in the packet checking unit of the first embodiment of this invention;

DESCRIPTION OF THE PREFERRED EMBODIMENTS

Figure 1:
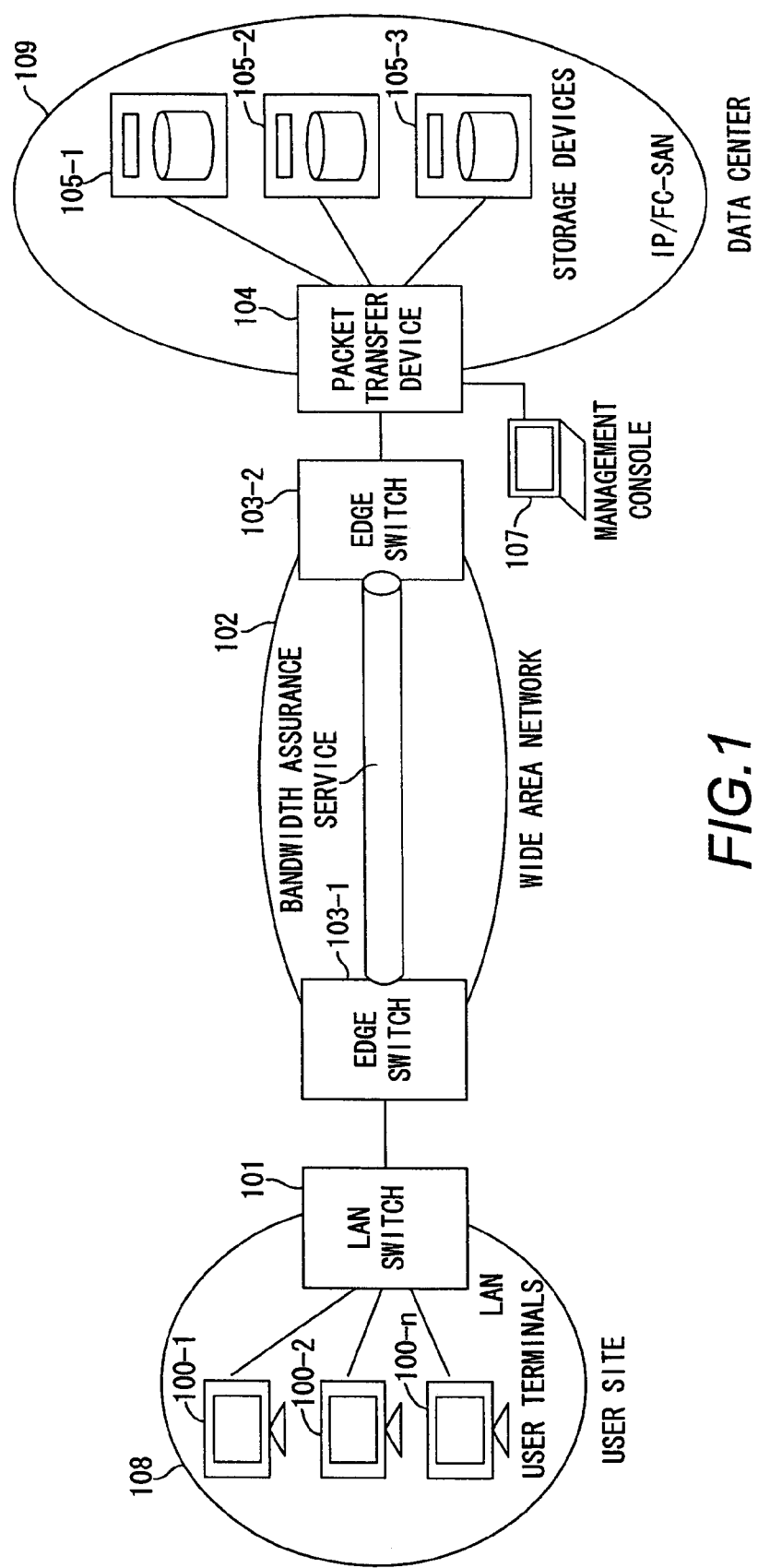
FIG. 1 is a block diagram of a storage-centric network system according to a first embodiment of this invention.

The embodiments of this invention are now described referring to the drawings.

First Embodiment

FIG. 1 is a block diagram of a storage-centric network system according to a first embodiment of this invention.

The storage-centric network system of the first embodiment is described as an example that uses the IPv4 protocol for the Layer 3 protocol of the OSI (Open Systems Interconnection) reference model, but other Layer 3 protocol, such as the IPv6 protocol, may be used.

Also, while the storage-centric network system of the first embodiment is described as an example that uses the iSCSI protocol, other protocol may be used. However, the protocol used shall be one that can obtain requested data size when a user terminal sends a data request command.

The storage-centric network system includes a user site 108, edge switches 103-1 and 103-2, a data center 109, and a management console 107.

In the user site 108, a LAN switch 101 and n user terminals 100-$i$ (i=1 to n) constitute a LAN (Local Area Network). The LAN switch 101 is connected to the edge switch 103-1 of a wide area network 102.

The user terminals 100 read and write data from and to storage devices 105 at the data center 109. The LAN switch 101 transfers received packets. Specifically, when receiving a packet directed within the user site 108, the LAN switch 101 transfers the packet to the destination user terminal 100. On the other hand, when receiving a packet directed out of the user site 108, the LAN switch 101 transfers the packet to the edge switch 103-1.

At the data center 109, a packet transfer device 104 and n storage devices 105-$i$ (i=1 to n) constitute an IP-SAN (Internet Protocol Storage Area Network). The packet transfer device 104 is connected to the edge switch 103-2 of the wide area network 102.

The storage devices 105, which store data from the user terminals 100, are a RAID device, JBOD (Just Bunch Of Disks), or the like, formed of disk controllers and disk drives.

As will be described in detail later, the packet transfer device 104 transfers received packets while controlling bandwidths on the wide area network 102.

The management console 107 is a computer that is connected to the packet transfer device 104 to manage the packet transfer device 104. The packet transfer device 104 and the management console 107 may be connected via a network.

The edge switch 103-1 on the side of the user site 108 and the edge switch 103-2 on the side of the data center 109 are connected to each other through the wide area network 102 to which a bandwidth assurance service is applied. The user site 108 is guaranteed the use a bandwidth on the wide area network. 102 according to a contract made with the wide area network carrier.

The edge switches 103-1 and 103-2 include the UPC (User Parameter Control). The UPC monitors the traffic on the wide area network to see whether it is within the contracted bandwidth. When detecting traffic exceeding the contracted bandwidth, the UPC discards packets exceeding the contracted bandwidth.

Next, a process performed by the user terminal 100 to read data from the storage 105 will be described.

First, the user terminal 100 requesting a data read sends an iSCSI command RD request to the storage 105. The RD request contains a request RD length. The request RD length is the size of the data that the user terminal 100 requests the storage 105 to read.

Receiving the RD request, the storage 105 reads the corresponding RD data from the storage. Then the storage 105 stores the RD data in an RD data packet and sends it toward the user terminal 100. When the size of the RD data exceeds the MTU (Maximum Transfer Unit) of the network path, the storage 105 stores the RD data in a plurality of RD data packets.

Now the discarding of packets during data read in a conventional storage-centric network system will be described.

The data size of the RD request is around 106 bytes. On the other hand, the size of the RD data is usually more than tens of kilobytes or hundreds of kilobytes, though it depends on the data the user terminal 100 requests.

Therefore, in the wide area network 102, the traffic of RD data packets may exceed the contracted bandwidth even when the traffic of RD requests is within the contracted bandwidth. RD data packets exceeding the contracted bandwidth are discarded on the way, e.g. by bandwidth control of the edge switch 103-2.

Next, a process performed by the user terminal 100 to write data to the storage 105 will be described.

First, the user terminal 100 requesting a data write sends an iSCSI command data WR request to the storage 105.

The storage 105 receiving the WR request makes preparations for the data write. When completing the preparations, the storage 105 sends an iSCSI packet R2T (Ready to Transfer) to the user terminal 100. The R2T contains a request WR length. The request WR length is the size of data that the storage 105 can accept at one time.

Receiving the R2T, the user terminal 100 stores, in a WR data packet, the WR data that meets the request WR length in the R2T and sends the packet toward the storage 105. When the WR data exceeds the MTU of the network path, the user terminal 100 stores the WR data in a plurality of the WR data packets and sends the data packets.

The discarding of packets during data write in a conventional storage-centric network system will be described.

As in the data read operation, the data sizes of the WR request and R2T are small, while that of the WR data packet 302 is large.

Accordingly, in the wide area network 102, the traffic of WR data packets may exceed the contracted bandwidth even when the traffic of WR requests and R2Ts is within the contracted bandwidth. WR data packets exceeding the contracted bandwidth are discarded on the way, e.g. by bandwidth control of the edge switch 103-1.

Packets may thus be discarded in conventional storage-centric network systems. The packet discarding causes troubles for the reasons below.

The iSCSI uses the TCP as a lower layer protocol. The TCP is a protocol that controls data transfer between sending terminals and receiving terminals. Packets discarded on the way are retransmitted by the TCP. However, the packet retransmission caused by packet discarding increases congestion on the wide area network 102 and therefore lowers the efficiency of use of the storage-centric network system.

Also, the TCP controls packet transfer using cwnd (Congestion Window). The cwnd indicates the maximum size of transmittable data during packet transfer from a sending terminal to a receiving terminal. At the beginning of a communication, the cwnd is 1 segment. When the communication is done without packet discarding, then the cwnd is increased to a furred window size. However, the cwnd is reduced when packets are discarded on the way.

The data transfer throughput using the TCP is cwnd/RTT (Round Trip Time). Thus, discarding packets reduces the cwnd and lowers the throughput.

Discarding packets thus reduces the efficiency of use of the storage-centric network system and also lowers the throughput.

Next, a packet used in communication through the storage-centric network system of the embodiment will be described.

Figure 2:
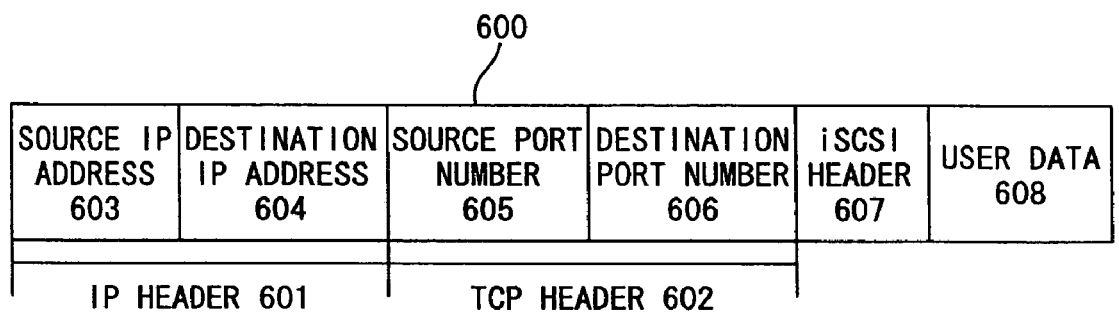
FIG. 2 is a diagram showing the configuration of an iSCSI packet of the first embodiment of this invention.

FIG. 2 is a diagram showing the configuration of an iSCSI packet according to the first embodiment of this invention.

The iSCSI packet 600 contains an IP header 601, a TCP header 602, an iSCSI header 607, and user data 608.

The IP header 601 contains a source IP address 603 and a destination IP address 604. The source IP address 603 is the address of the terminal sending the packet. The destination IP address 604 is the address of the terminal receiving the packet.

The TCP header 602 contains a source port number 605 and a destination port number 606. The source port number 605 indicates a protocol or application of the terminal sending the packet. The destination port number 606 indicates a protocol or application of the terminal receiving the packet.

Figure 3:
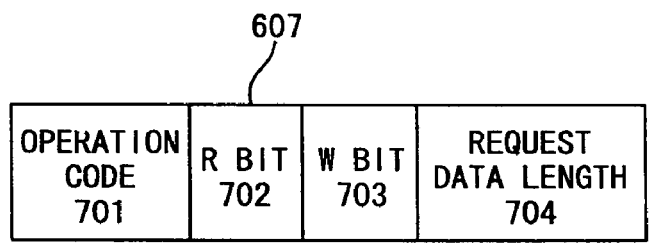
FIG. 3 is a diagram showing the configuration of an iSCSI header of an RD or WR request sent by a user terminal of the first embodiment of this invention.
Figure 4:
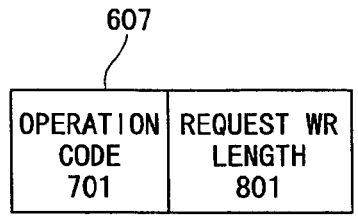
FIG. 4 is a diagram showing the configuration of an iSCSI header of an R2T sent by a storage of the first embodiment of this invention.

The iSCSI header 607, formed as shown in FIG. 3 or 4, indicates the command type etc. of the packet. The user data 608 stores main data of the packet.

FIG. 3 is a diagram showing the configuration of the iSCSI header 607 of an RD or WR request sent by the user terminal 100 of the first embodiment of this invention.

An RD request is a packet by which the user terminal 100 requests data read from a storage 105. A WR request is a packet by which the user terminal 100 requests data write to the storage 105.

The iSCSI header 607 of an RD request or WR request includes an operation code 701, a Read (R) bit 702, a Write (W) bit 703, and a request data length 704.

The operation code 701 shows the type of the SCSI command of the packet, where "ox1" is stored to indicate the iSCSI command.

The R bit 702 stores "1" when the packet is an RD request. The W bit 703 stores "1" when the packet is a WR request. The request data length 704 stores the request RD length when the packet is an RD request, and stores the WR request data length when the packet is a WR request.

The request RD length is the size of the data that the user terminal 100 requests the storage 105 to read. The WR request data length is the size of the data that the user terminal 100 requests the storage 105 to write.

FIG. 4 is a diagram showing the configuration of the iSCSI header 607 of an R2T sent by a storage 105 of the first embodiment.

The R2T is a packet which reports that the storage 105 has finished data write preparations.

The iSCSI header 607 of the R2T contains an operation code 701 and a request WR length 801. The operation code 701 shows the type of the iSCSI command, where "0×31" is stored to indicate R2T. The request WR length 801 is the size of the data that the storage 105 can accept from the user terminal 100 at one time.

Figure 5:
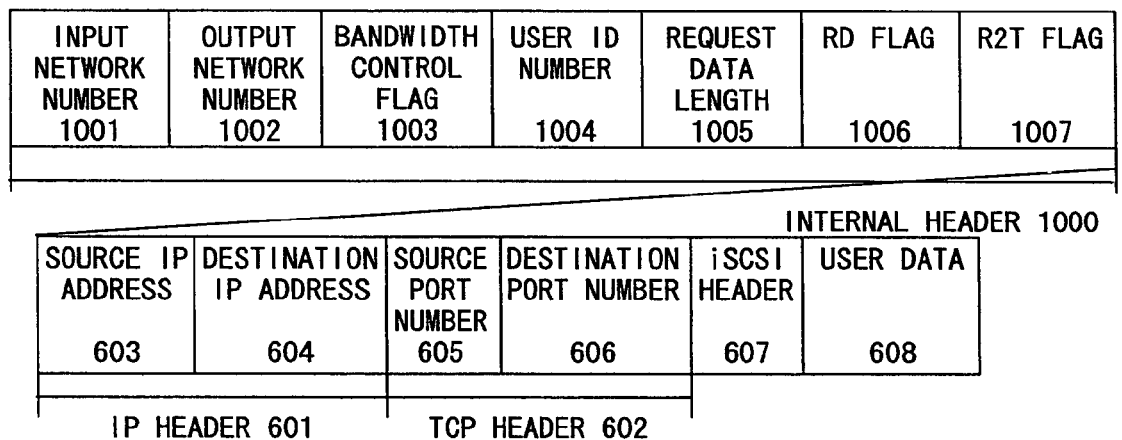
FIG. 5 is a diagram showing the configuration of a packet inside a packet transfer device of the first embodiment of this invention.

FIG. 5 is a diagram showing the configuration of a packet inside the packet transfer device 104 of the first embodiment of this invention.

The iSCSI packet 600 is provided with an internal header 1000 inside the packet transfer device 104.

The internal header 1000 includes an input network number 1001, an output network number 1002, a bandwidth control flag 1003, a user ID number 1004, a request data length 1005, an RD flag 1006, and an R2T flag 1007.

The input network number 1001 is an identifier of the network from which the packet is inputted. The output network number 1002 is an identifier of the network from which the packet is outputted. The bandwidth control flag 1003 shows whether this packet is bandwidth-controlled.

The user ID number 1004 is an identifier of the user site 108 to which the user terminal 100 sending the packet belongs. The request data length 1005 stores the request RD length when the packet is an RD request, or stores the request WR length when it is an R2T. The RD flag 1006 indicates whether the source IP address 603 of the packet is stored in an RD control table, as will be described later referring to FIG. 8. The R2T flag 1007 indicates whether the destination IP address 604 of the packet is stored in an R2T table, as will be described later referring to FIG. 9.

Figure 6:
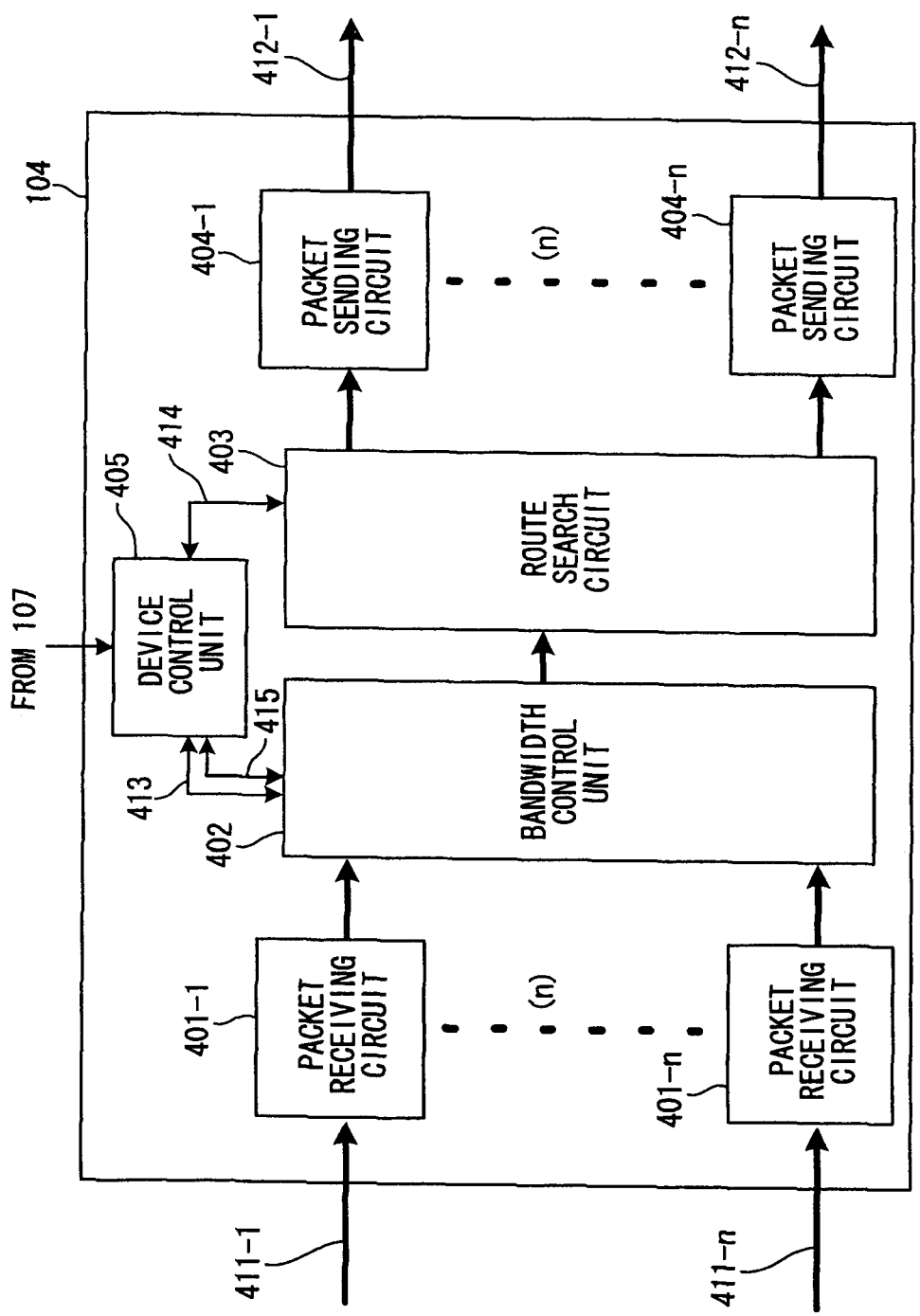
FIG. 6 is a block diagram of the packet transfer device of the first embodiment of this invention.

FIG. 6 is a block diagram of the packet transfer device 104 of the first embodiment of this invention.

The packet transfer device 104 includes input networks 411, packet receiving circuits 401, a bandwidth control unit 402, a route search circuit 403, a device control unit 405, packet sending circuits 404, and output networks 412.

The input networks 411 include n lines, which externally input packets to the packet receiving circuits 401. The n packet receiving circuits 401 are provided as many as the input networks 411, and process the reception of packets. A single packet receiving circuit 401 may be provided for a plurality of input networks 411.

The bandwidth control unit 402 sends packets to the route search circuit 403 while controlling sending intervals. Detailed configuration of the bandwidth control unit 402 will be described later referring to FIG. 7. The route search circuit 403 contains a route search table (not shown) and searches the table to see which output network a packet is to be sent on. The route search table contains the destination IP addresses 604 and the numbers of the output networks 412 that correspond to the destination IP addresses 604.

The device control unit 405 sets various information in the bandwidth control unit 402 through signal lines 413 and 415. The various information includes contracted bandwidth information about the wide area network 102, net mask information about the user site 108, and the like. The device control unit 405 also sets packet route search information etc. in the route search circuit 403 through a signal line 414. These pieces of information are inputted to the device control unit 405 from the management console 107.

The output networks 412 include n lines, which send out packets from the packet sending circuits. The n packet sending circuits 404 are provided as many as the output networks 412, and process the sending of the packets to send out through the output networks 412. A single packet sending circuit 404 may be provided for a plurality of output networks 412.

Next, a process performed by the packet transfer device 104 when receiving a packet is briefly described.

An incoming packet is inputted to a packet receiving circuit 401 through an input network 411. Receiving the packet, the packet receiving circuit 401 adds the internal header 1000 to the packet. Initial values are set in individual items constituting the internal header 1000.

Next, the packet, receiving circuit 401 stores the network number of the input network 411 that received the packet, in the input network number 1001 of the added internal header 1000. Then the packet receiving circuit 401 sends the packet to the bandwidth control unit 402.

The bandwidth control unit 402 refers to the bandwidth control flag 1003 to see whether the received packet is a bandwidth control packet or a non bandwidth control packet.

When deciding that the packet is a bandwidth control packet, the bandwidth control unit 402 sends the packet to the route search circuit 403 while controlling transmission intervals in such a way that no packet loss occurs.

On the other hand, when deciding that the packet is a non bandwidth control packet, the bandwidth control unit 402 immediately sends the packet to the route search circuit 403.

The route search circuit 403 receives the packet and refers to the destination IP address 604 of the packet and searches the route search table to retrieve an output network 412 for sending the packet. The route search circuit 403 stores the number of the retrieved output network 412 in the output network number 1002 of the internal header 1000. Then, the route search circuit 403 sends the packet to the packet sending circuit 404 connected to the retrieved/located output network 412.

The packet sending circuit 404, receiving the packet, extracts the output network number 1002 from its internal header 1000. Next, the packet sending circuit 404 removes the internal header 1000 from the packet. The packet sending circuit 404 then sends out the packet through the output network 412 that corresponds to the extracted output network number 1002.

Figure 7:
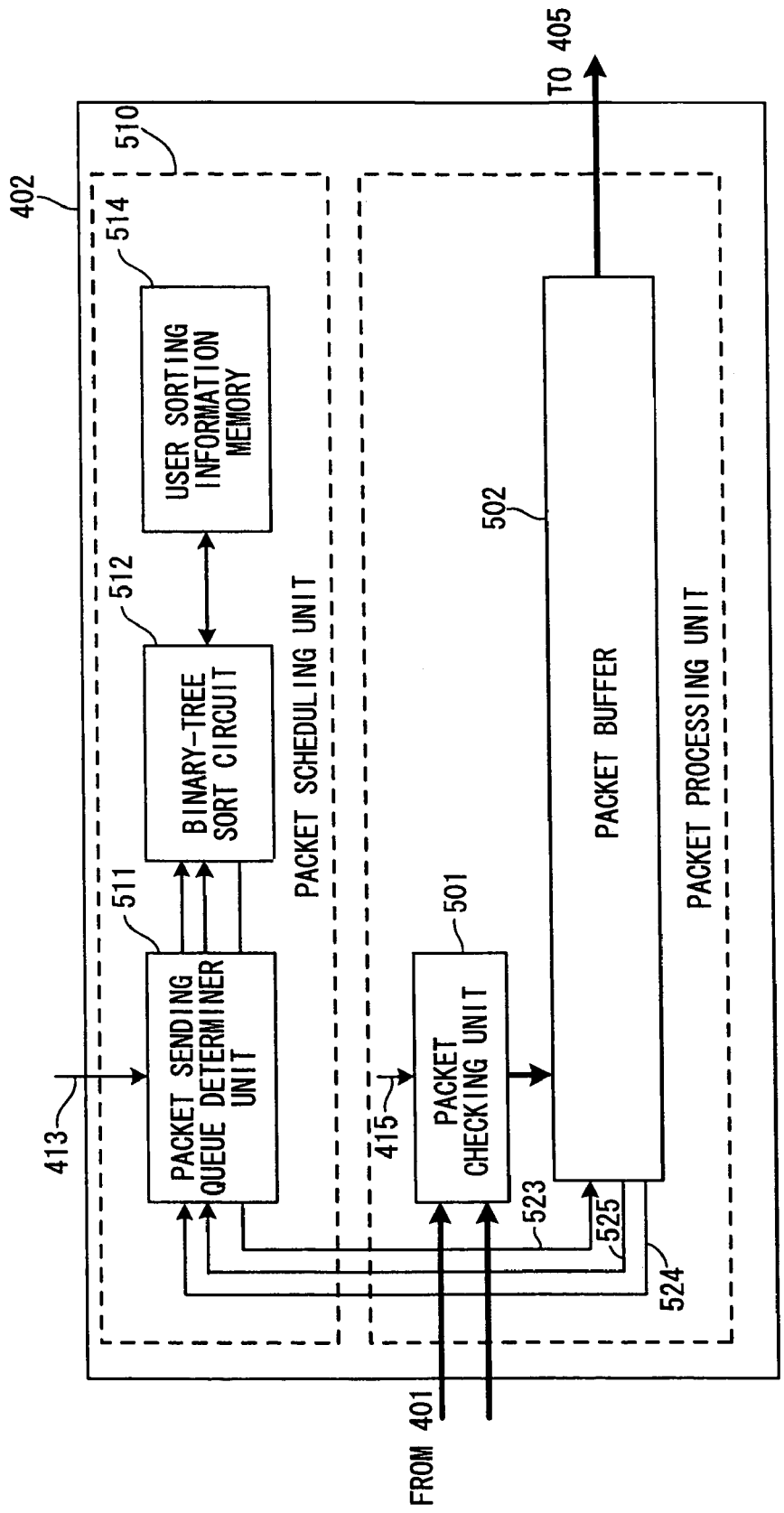
FIG. 7 is a block diagram of a bandwidth control unit of the first embodiment of this invention.

FIG. 7 is a block diagram of the bandwidth control unit 402 of the first embodiment of this invention.

The bandwidth control unit 402 includes a packet processing unit 500 and a packet scheduling unit 510.

The packet processing unit 500 includes a packet checking unit 501 and a packet buffer 502. The packet checking unit 501 checks a packet received from a packet receiving circuit 401 to see its type and then sends the packet to the packet buffer 502. The packet checking unit 501 contains the RD control table shown in FIG. 8 and the R2T control table shown in FIG. 9. The packet checking unit 501 updates those tables on the basis of information sent from the device control unit 405 through the signal line 415. The packet buffer 502 holds packets received from the packet checking unit 501 according to the user ID number 1004.

The packet scheduling unit 510 includes a packet sending queue determiner unit 511, a binary-tree sort circuit 512, and a user sorting information memory 514. The packet sending queue determiner unit 511 determines the order for sending packets held in the packet buffer 502. The packet sending queue determiner unit 511 is supplied through the signal line 413 with various information for determining the order.

The binary-tree sort circuit 512 determines the user terminal 100 that sends the packet earliest. The user sorting information memory 514 stores information used by the binary-tree sort circuit 512.

FIG. 8 is a diagram illustrating the configuration of the RD control table in the packet checking unit 501 of the first embodiment of this invention.

The RD control table 900 includes source IP address group 901, net mask 902, user ID number 903, and control bandwidth 904.

The source IP address group 901 includes an IP address of the user site 108 to which user terminals 100 sending RD requests belong. The net mask 902 separates the IP address of the user site 108 to which the user terminal 100 belong from the source IP address 603 of the packet. The user ID number 903 includes an identifier of the user site 108 to which the user terminals 100 belong. The control bandwidth 904 is the contracted bandwidth on the wide area network 102 promised to the user site 108 to which the user terminals 100 belong.

FIG. 9 is a diagram illustrating the configuration of the R2T control table in the packet checking unit 501 of the first embodiment of this invention.

The R2T table 1700 includes destination IP address group 1701, net mask 1702, user ID number 1703, and control bandwidth 1704.

The destination IP address group 1701 includes the IP address of the user site 108 to which user terminals 100 receiving R2Ts belong. The net mask 1702 separates the IP address of the user site 108 to which the user terminal 100 belongs from the destination IP address 604 of the packet. The user ID number 1703 includes an identifier of the user site 108 to which the user terminals 100 belong. The control bandwidth 1704 includes the contracted bandwidth on the wide area network 102 promised to the user site 108 to which the user terminals 100 belong.

Figure 10:
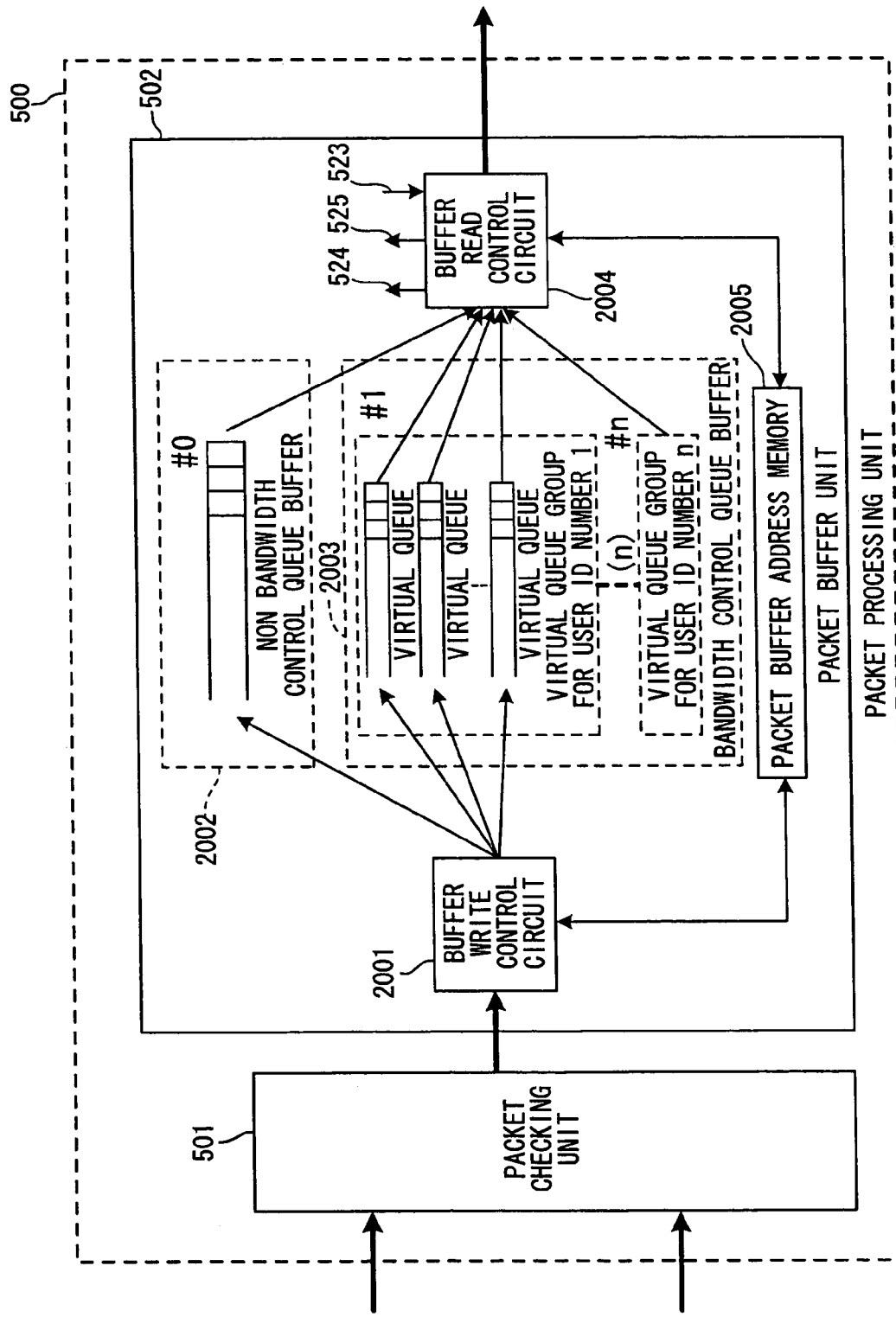
FIG. 10 is a block diagram of a packet buffer of the first embodiment of this invention.

FIG. 10 is a block diagram of the packet buffer 502 of the first embodiment of this invention.

The packet buffer 502 includes a buffer write control circuit 2001, a non bandwidth control queue buffer 2002, a bandwidth control queue buffer 2003, a buffer read control circuit 2004, and a packet buffer address memory 2005.

The buffer write control circuit 2001 stores packets received from the packet checking unit 501, in the non bandwidth control queue buffer 2002 or in the bandwidth control queue buffer 2003.

The non bandwidth control queue buffer 2002 has a single queue corresponding to the user ID number "0", for temporarily holding non bandwidth control packets. The bandwidth control queue buffer 2003 has groups of virtual queues that are sectioned for individual user ID numbers, for temporarily holding bandwidth control packets. A virtual queue group is formed of a plurality of virtual queues for each of the individual user terminals 100. A virtual queue group may be formed of virtual queues shared by a plurality of user terminals 100 in the same user site 108, or may be formed of a single virtual queue.

The buffer read control circuit 2004 reads packets from the non bandwidth control queue buffer 2002 or from the bandwidth control queue buffer 2003. The packet buffer address memory 2005 stores packet buffer addresses of the non bandwidth control queue buffer 2002 and the bandwidth control queue buffer 2003 that hold packets.

Figure 11:
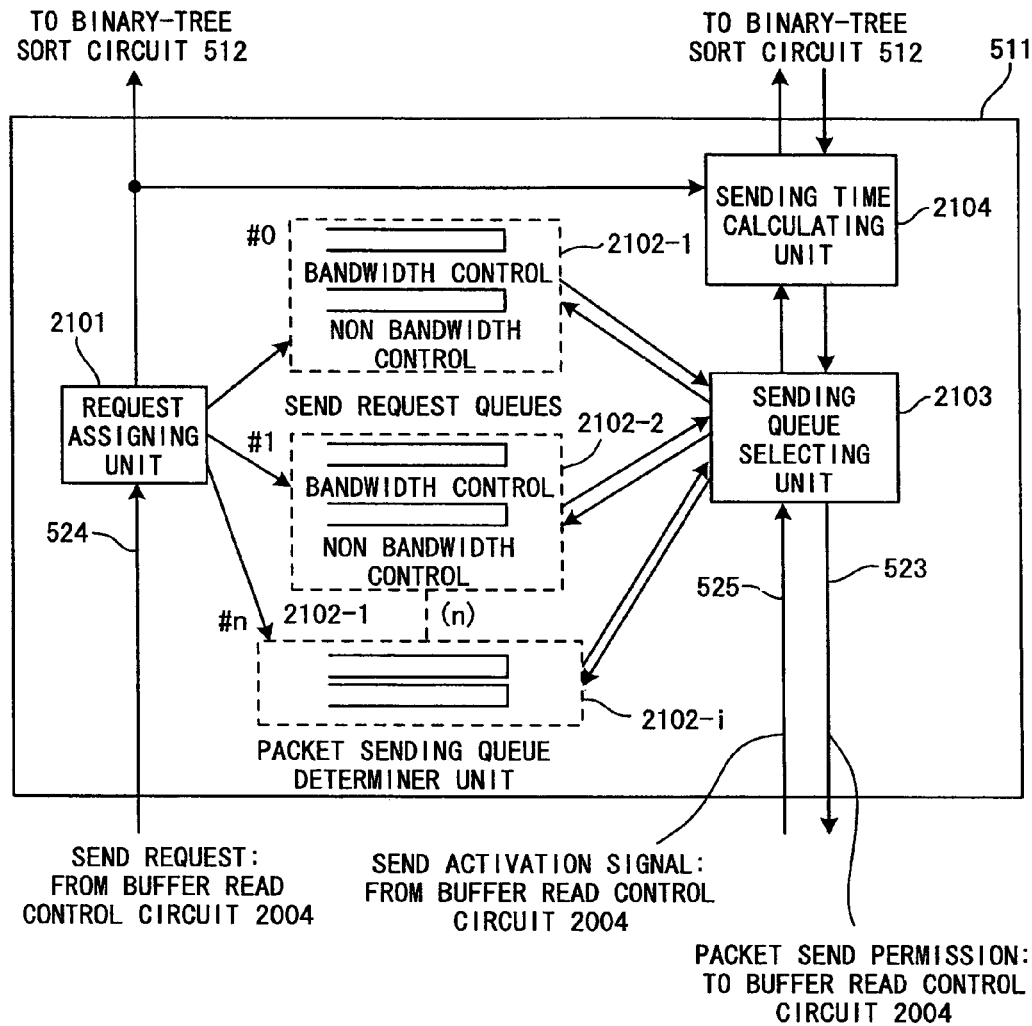
FIG. 11 is a block diagram of a packet sending queue determiner unit of the first embodiment of this invention.

FIG. 11 is a block diagram of the packet sending queue determiner unit 511 of the first embodiment of this invention.

The packet send queue determiner unit 511 includes a request assigning unit 2101, send request queues 2102, a sending queue selecting unit 2103, and a sending time calculating unit 2104.

The number of the send request queues 2102 corresponds to the total number of the user ID numbers 903 and the user ID numbers 1703. The send request queues 2102 store send requests 524 according to the user ID numbers 903 and 1703. The send request queues 2102 manage the storing addresses in which send requests 524 are stored by the request assigning unit 2101. Further more, the send request queues 2102 manages a status of the queues which includes information of number of the send requests 524 stored in the send request queues 2102. In addition, the send request queues 2102 inform the sending queue selecting unit 2103 of a scheduling list, when the send requests 524 are stored in a non bandwidth control queue which no send request 524 is stored therein. The send requests 524 request permission for sending packets held in the packet buffer 502.

Each send request queue 2102 includes a bandwidth control queue and a non bandwidth control queue. The bandwidth control queue stores send requests 524 having the bandwidth control flag 1003 of "1". The non bandwidth control queue stores send requests 524 having the bandwidth control flag 1003 of "0".

The request assigning unit 2101 stores, in the send request queues 2102, the send requests 524 that are received from the packet buffer 502.

More specifically, when receiving a send request 524, the request assigning unit 2101 checks the value of the bandwidth control flag 1003 of that send request 524. When "1" is stored in the bandwidth control flag 1003, the request assigning unit 2101 stores the send request 524 in the bandwidth control queue in the send request queue 2102 that corresponds to the user ID number 1004. Next, the request assigning unit 2101 sends the user ID number 1004 and the request data length 1005 to the binary-tree sort circuit 512 and the sending time calculating unit 2104.

On the other hand, when "0" is stored in the bandwidth control flag 1003, the request assigning unit 2101 stores the send request 524 in the non bandwidth control queue in the send request queue 2102 that corresponds to the user ID number 1004. In this case, the request assigning unit 2101 does not send the user ID number 1004 and the request data length 1005 to the binary-tree sort circuit 512 and the sending time calculating unit 2104.

The sending time calculating unit 2104 calculates the time for sending a send request 524 having the bandwidth control flag 1003 of "1" and informs the sending queue selecting unit 2103 of the sending time. The sending queue selecting unit 2103 selects a send request 524 that is granted permission of send from the send request queues 2102.

Figure 12:
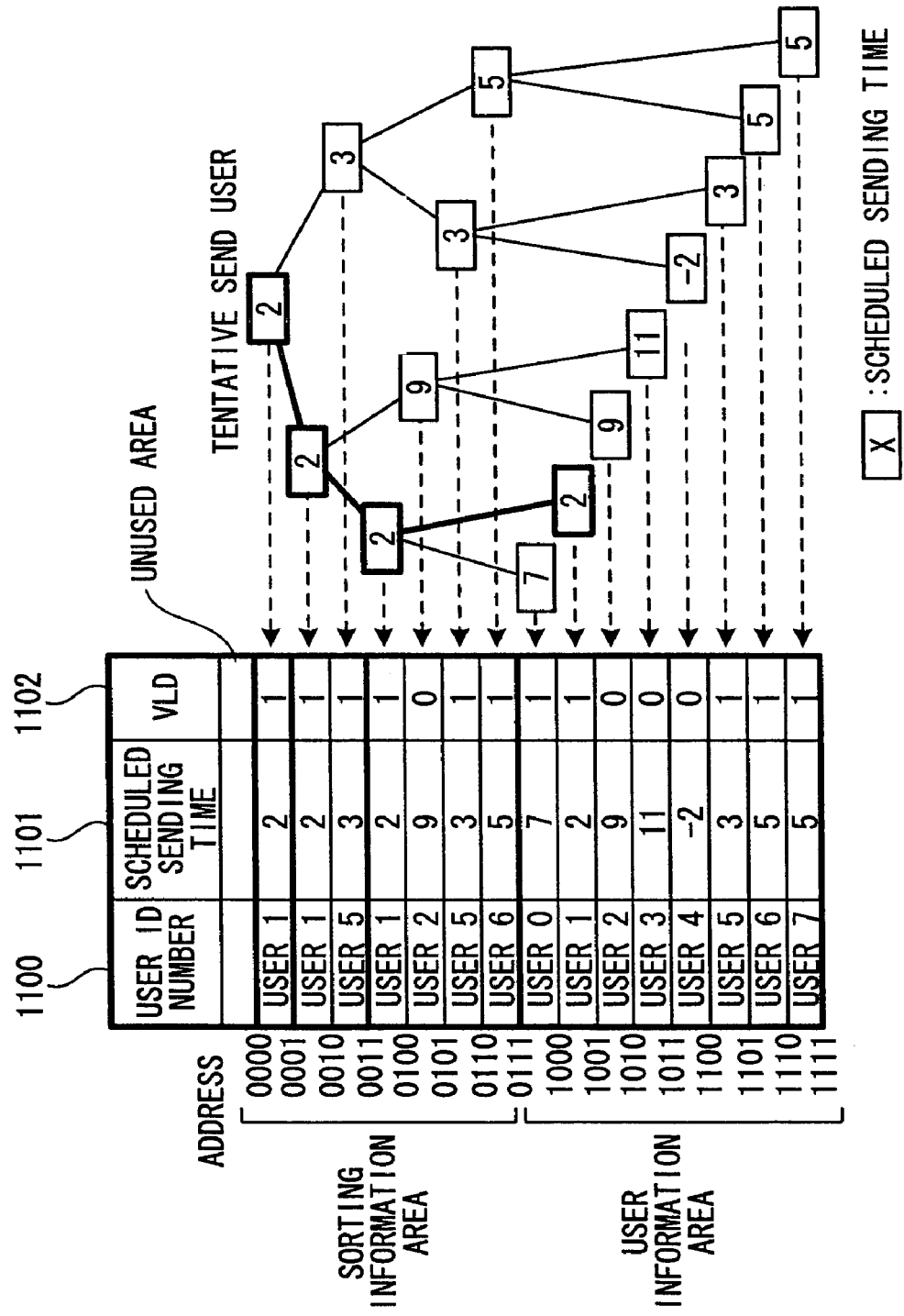
FIG. 12 is an explanatory diagram illustrating a user sorting information memory of the first embodiment of this invention.

FIG. 12 is an explanatory diagram of the user sorting information memory 514 of the first embodiment of this invention.

The user sorting information memory 514 stores user sorting information. The user sorting information includes user ID number 1100, scheduled sending time 1101, and VLD 1102.

The user ID number 1100 includes the identifier of the user site 108 to which the user terminals 100 belong. The scheduled sending time 1101 includes a scheduled time at which the sending queue selecting unit 2103 intends to read a send request 524 from the bandwidth control queue that corresponds to the user ID number of the record. The VLD 1102 stores "1" when a send request 524 is held in a bandwidth control queue.

The entries from address "1000" to address "1111" form a user information area and the entries from address "0000" to address "0111" form a sorting information area. In the user information area, the binary-tree sort circuit 512 stores sorting information about users 0 to 7 in order of user ID number 1100. In the sorting information area, the binary-tree sort circuit 512 stores information for selecting a user with the earliest scheduled sending time (a tentative send user).

Next, a sorting process performed by the binary-tree sort circuit 512 to store values in the user sorting information memory 514 will be described.

Figure 13:
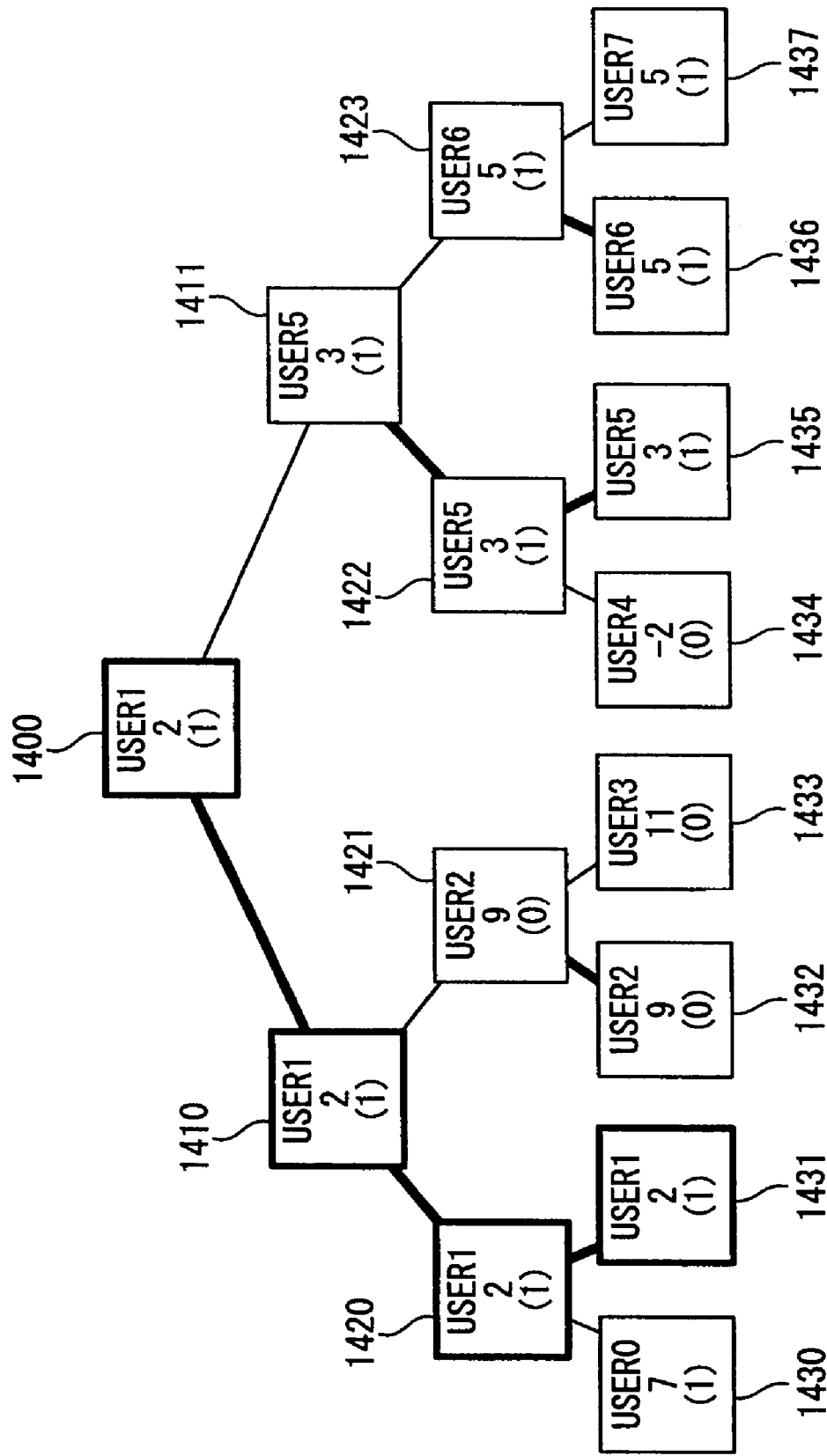
FIG. 13 is an explanatory diagram illustrating a sorting process performed by a binary-tree sort circuit of the first embodiment of this invention.

FIG. 13 is an explanatory diagram illustrating the sorting process by the binary-tree sort circuit 512 of the first embodiment of this invention.

FIG. 13 shows a binary tree structure. The binary tree of FIG. 13 has entries at the top (root), branch points, and tips (leaves). The entry located at the root of the binary tree is called the root entry and the entries located at the leaves are called leaf entries. Also, seen from an arbitrary entry, the entry at the root side is called a parent entry and the two entries at the leaf side are called child entries. Each entry stores the user ID number, real scheduled sending time, and VLD, sequentially from the top.

First, the binary-tree sort circuit 512 stores the user ID numbers, real scheduled sending times, and VLDs of all user terminals 100 in the leaf entries 1430 to 1437 set in the user information area.

Next, the binary-tree sort circuit 512 selects one of the child entries below a parent entry. Then, the binary-tree sort circuit 512 stores the information of the selected entry into the parent entry.

More specifically, the binary-tree sort circuit 512 selects values from the leaf entries 1430 to 1437 and stores the selected values in the entries 1420 to 1423. The binary-tree sort circuit 512 next selects values from the entries 1420 to 1423 and stores the selected values in the entries 1410 and 1411. Then the binary-tree sort circuit 512 selects values from the entries 1410 and 1411 and stores the selected values in the entry 1400.

The binary-tree sort circuit 512 selects one of child entries according to the rules (1) to (3) below.

(1) When one child entry has VLD of "1" and the other has VLD of "0", the binary-tree sort circuit 512 selects the child entry of VLD "1".

For example, the entry 1422 has the child entries 1434 and 1435. The binary-tree sort circuit 512 compares the entries 1434 and 1435 and selects the entry 1435 having VLD of "1".

(2) When both child entries have VLD of "1", the binary-tree sort circuit 512 selects the entry having an earlier scheduled sending time. When two child entries both have VLD of "1" and the same scheduled sending time, the binary-tree sort circuit 512 selects the one having a smaller user ID number.

For example, the entry 1420 has the child entries 1430 and 1431. The binary-tree sort circuit 512 compares the entries 1430 and 1431 to know that they both have VLD of "1" and so selects the entry 1431 having the earlier real sending time.

(3) When child entries both have VLD of "0", the binary-tree sort circuit 512 selects the child entry having an earlier real scheduled sending time. When child entries both have VLD of "0" and the same scheduled sending time, the binary-tree sort circuit 512 selects the one having a smaller user ID number.

For example, the entry 1421 has the child entries 1432 and 1433. The binary-tree sort circuit 512 compares the entries 1432 and 1433 to know that they both have VLD of "0" and so selects the entry 1432 having an earlier real sending time.

The binary-tree sort circuit 512 stores values sequentially from the leaf entries according to the rules above to determine a tentative send user.

Next, address management in the user sorting information memory 514 will be described. Here, the number of users is M (=the mth power of 2). The addresses are represented in binary (m+1 bits).

The address of the root of the binary tree in the user sorting information memory 514 is set as "000 . . . 001". Also, with an entry having address "xyy . . . yyz", the address of its parent entry is "0xy . . . yyy" and the addresses of its child entries are "yyy . . . yz0" and "yyy . . . yz1". The addresses of the leaf entries are from "100 . . . 000" to "111 . . . 111".

Managing addresses in the user sorting information memory 514 in this way allows simple configuration of the address generating circuit for accessing the user sorting information memory 514. This is because it is simple to compare entries having address "xyy . . . yy0" and address "xyy . . . yy1", and write the result in the entry having address "0xy . . . yyy".

Next, a sorting process will be described which the binary-tree sort circuit 512 performs when the scheduled sending time of the user 4 in the state shown in FIG. 13 has been updated to "1".

Figure 14:
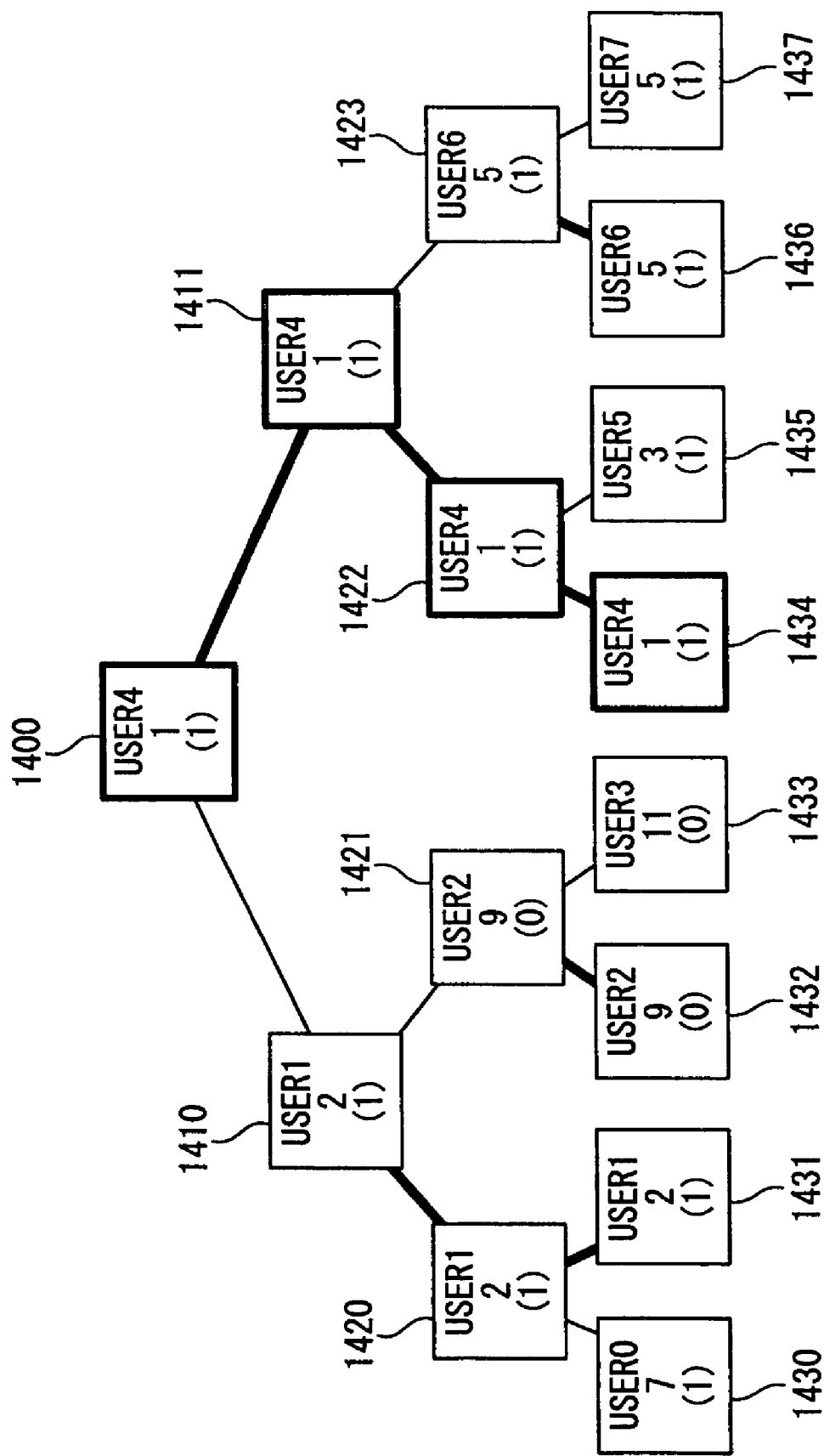
FIG. 14 is an explanatory diagram illustrating the sorting process that the binary-tree sort circuit of the first embodiment of this invention performs after a scheduled sending time has been updated.

FIG. 14 is an explanatory diagram illustrating the sorting process that the binary-tree sort circuit 512 of the first embodiment of this invention performs when a scheduled sending time has been updated.

First, the binary-tree sort circuit 512 rewrites the entry 1434 of the user 4 whose scheduled sending time has been updated. More specifically, the binary-tree sort circuit 512 rewrites the real scheduled sending time of the entry 1434 to "1" and rewrites its VLD to "1".

Next, the binary-tree sort circuit 512 updates entries except the leaf entries 1430 to 1437. However, the binary-tree sort circuit 512 does not have to update all entries but it only updates the entries in the route from the rewritten leaf entry 1434 to the root entry 1400. In FIG. 14, the binary-tree sort circuit 512 has updated the entries 1434, 1422, 1411, and 1400 according to the rules mentioned above.

Thus, when a scheduled sending time is updated, the binary-tree sort circuit 512 updates the tentative send user.

Next, a process performed by the bandwidth control unit 402 when receiving and sending a packet will be described.

Figure 15:
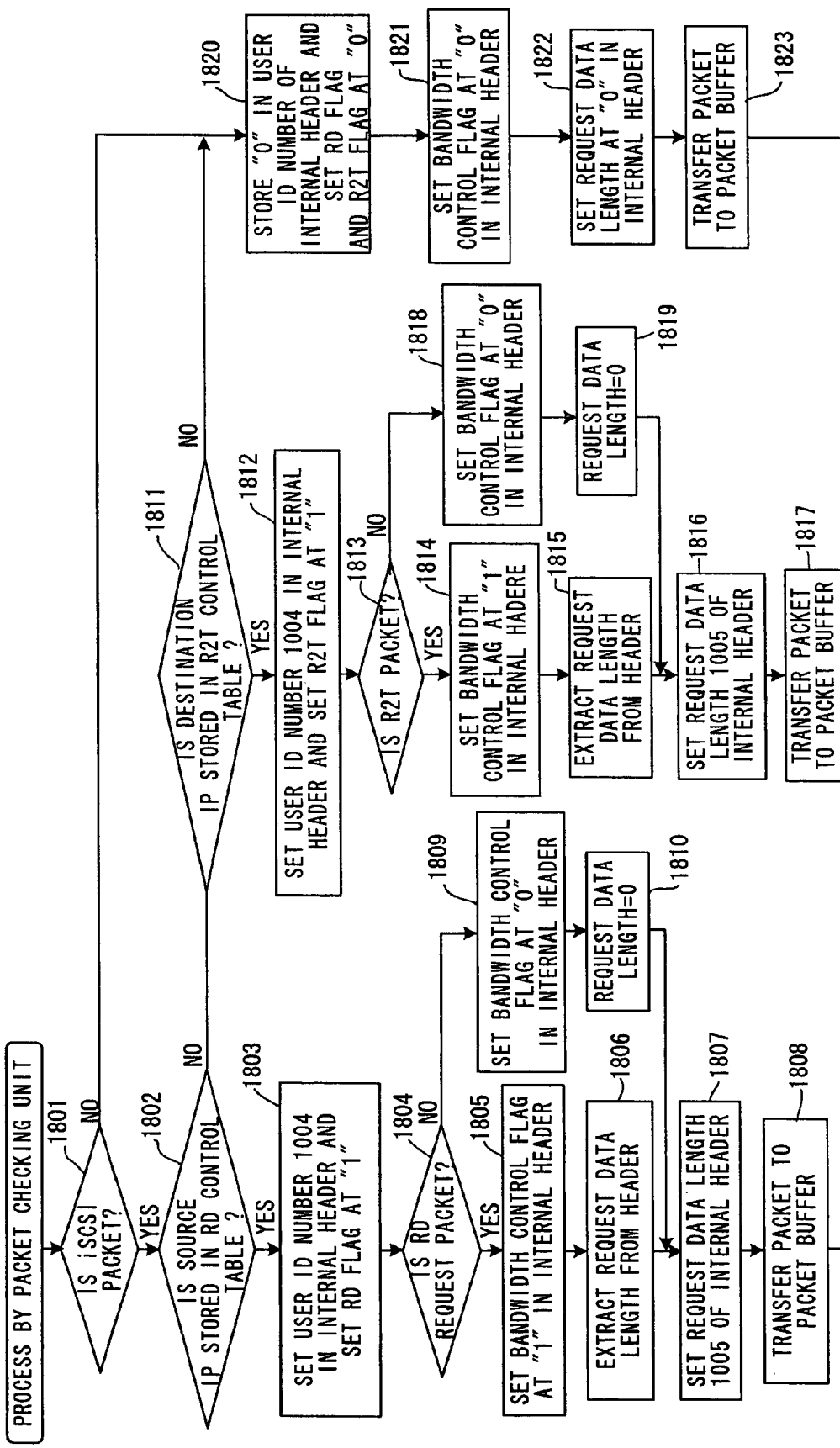
FIG. 15 is a flowchart of a process performed by the packet checking unit of the first embodiment of this invention.

FIG. 15 is a flowchart of the process by the packet checking unit 501 of the first embodiment of this invention.

First, when a packet (input packet) is received, the source port number 605 and the destination port number 606 are extracted from the TCP header 602. The extracted source port number 605 and destination port number 606 are checked to see whether the input packet is an iSCSI packet or not (1801).

When the input packet is an iSCSI packet, it is checked whether the source IP address 603 of the input packet is stored in the RD control table 900 (1802).

More specifically, the source IP address 603 is extracted from the input packet. Next, the conjunction of the extracted source IP address 603 and the net mask 902 in the RD control table 900 is calculated. It is then checked whether the calculated conjunction is stored in the source IP address group 901 in the RD control table 900.

When a record storing the calculated conjunction is found in the RD control table 900, the user ID number 903 of the record is extracted. Next, the extracted user ID number 903 is stored in the user ID number 1004 and "1" is stored in the RD flag 1006 (1803).

Next, the operation code 701 and the R bit 702 are checked to see whether the input packet is an RD request (1804). With an iSCSI command, the input packet is judged as an RD request when "0×1" is stored in the operation code 701 and "1" is stored in the R bit 702.

When the input packet is an RD request, "1" is stored in the bandwidth control flag 1003 (1805). Next, the request data length 704 is extracted from the iSCSI header 607 of the input packet (1806).

Next, the extracted request data length 704 is stored in the request data length 1005 (1807). Then the input packet is transferred to the packet buffer (1808) and the process ends.

On the other hand, when the step 1804 judges that the input packet is not an RD request, "0" is stored in the bandwidth control flag 1003 (1809). Next, since the input packet is a non bandwidth control packet, the request data length is set to "0" (1810) and stored in the request data length 1005 (1807). Then the input packet is transferred to the packet buffer 502 (1808) and the process ends.

On the other hand, when the step 1802 does not find the calculated conjunction in the RD control table 900, it is checked whether the destination IP address 604 of the input packet is stored in the R2T control table 1700 (1811).

More specifically, the destination IP address 604 is extracted from the input packet. Next, the conjunction of the extracted destination IP address 604 and the net mask 1702 in the R2T control table 1700 is calculated. Then it is checked whether the calculated conjunction is stored in the destination IP address 1701 in the R2T control table 1700.

When a record storing the calculated conjunction is found in the R2T control table 1700, the user ID number 1703 of the record is extracted. Next, the extracted user ID number 1703 is stored in the user ID number 1004 and "1" is stored in the R2T flag 1007 (1812).

Next, the operation code 701 is checked to see whether the input packet is an R2T or not (1813). With an iSCSI command, the input packet is judged as an R2T when "0×31" is stored in the operation code 701.

When the input packet is an R2T , "1" is stored in the bandwidth control flag 1003 (1814). Next, the request WR length 801 is extracted from the iSCSI header 607 of the input packet (1815).

Next, the extracted request WR length 801 is stored in the request data length 1005 (1816). Then, the input packet is transferred to the packet buffer 502 (1817) and the process ends.

On the other hand, when the step 1813 judges that the input packet is not an R2T, "0" is stored in the bandwidth control flag 1003 (1818). Next, since the input packet is a non bandwidth control packet, the request data length is set to "0" (1819) and stored in the request data length 1005 (1816). The packet checking unit 501 then transfers the input packet to the packet buffer 502 (1817) and the process ends.

On the other hand, in the step 1801, when it is judged that the input packet is not an iSCSI packet, or in the step 1811, when it is judged that the destination IP address 604 is not stored in the R2T control table 1700, there is no need for bandwidth control, and "0" is stored in the user ID number 1004, RD flag 1006, and R2T flag 1007 (1820).

Next, "0" is stored in the bandwidth control flag 1003 (1821). Next, "0" is stored in the request data length 1005 (1822). The input packet is then transferred to the packet buffer 502 (1823) and the process ends.

As described above, the packet checking unit 501 checks the type of an input packet and stores corresponding values in the internal header 1000. In other words, when the input packet is an iSCSI RD request or an iSCSI R2T, bandwidth control is required, and the packet checking unit 501 sets "1" in the bandwidth control flag 1003 and sets the data length in the request data length 1005. In other cases, bandwidth control is not required, and so the packet checking unit 501 sets "0" in the bandwidth control flag 1003 and in the request data length 1005.

In the step 1803, the packet checking unit 501 stores, in the user ID number 1004, the user ID number 903 that corresponds to the source IP address 603. Therefore, the packet buffer 502 stores input packets in queues according to the user ID number 1004, regardless of whether the input packets are bandwidth control packets or non bandwidth control packets. This prevents the order of packets sent from the same source IP address 903 from being changed in the packet transfer device 104.

Now the reason why this embodiment prevents packet order from being changed will be described.

Packets sent from the same sending terminal are likely to belong to the same TCP flow (packets with the same source IP address 603, same destination IP address 604, same source port number 605, and same destination port number 606). The TCP headers 602 of packets contain sequence numbers. The sequence numbers show the order in which packets belonging to the same TCP flow were sent from the sending terminal. When receiving packets, the receiving terminal refers to the sequence numbers to see whether the packets have arrived in the correct order or not. If packets did not arrive in the correct order, the receiving terminal may fail to correctly receive the packets and discard the packets. Therefore, in this embodiment, changing the order of packets belonging to the same TCP flow is not permitted.

Similarly, in the step 1812, the packet checking unit 501 stores, in the user ID number 1004, the user ID number 1703 that corresponds to the destination IP address. This prevents the order of packets to be sent to the same destination IP address 604 from being changed in the packet transfer device 104.

Figure 16:
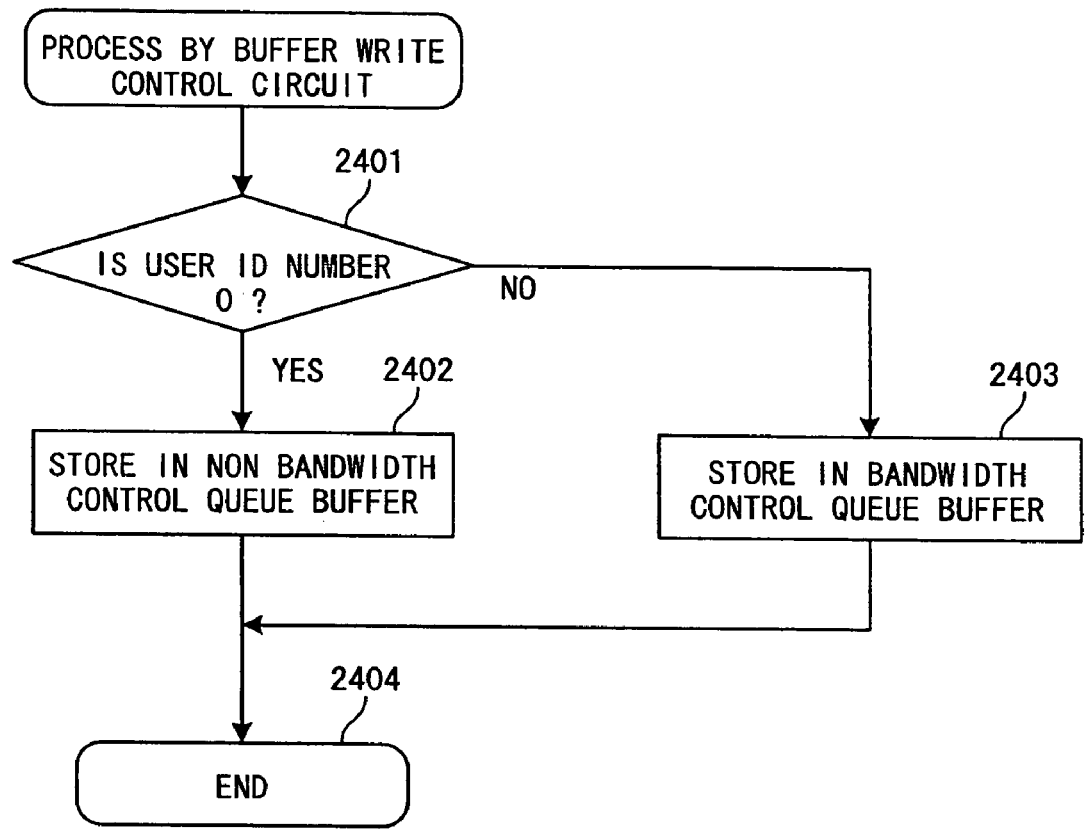
FIG. 16 is a flowchart of a process performed by a buffer write control circuit of the first embodiment of this invention.

FIG. 16 is a flowchart of a process performed by the buffer write control circuit 2001 of the first embodiment of this invention.

First, when receiving a packet from the packet checking unit 501, the buffer write control circuit 2001 extracts the user ID number 1004 from the received packet. Next, it checks whether the extracted user ID number 1004 is "0" (2401).

When the ID number 1004 is "0", the packet is stored in the non bandwidth control queue buffer 2002 (2402), and the process ends (2404).

On the other hand, when the user ID number 1004 is not "0", the process selects a virtual queue group in the bandwidth control queue buffer 2003 whose user ID number agrees with the extracted ID number 1004, and selects a virtual queue in the group, and stores the packet there (2403).

More specifically, the RD flag 1006 and the R2T flag 1007 of the received packet are checked. When "1" is stored in the RD flag, the buffer write control circuit 2001 refers to the source IP address 603 to select a virtual queue for storing the packet. On the other hand, when "1" is stored in the R2T flag, the buffer write control circuit 2001 refers to the destination IP address 604 to select a virtual queue for storing the packet. Selecting a virtual queue for storing a packet in this way prevents changing the order of packets belonging to the same TCP flow.

Subsequently, the packet is stored in the selected virtual queue in the bandwidth control queue buffer 2003.

The packet is thus stored and the process ends (2404).

Figure 17:
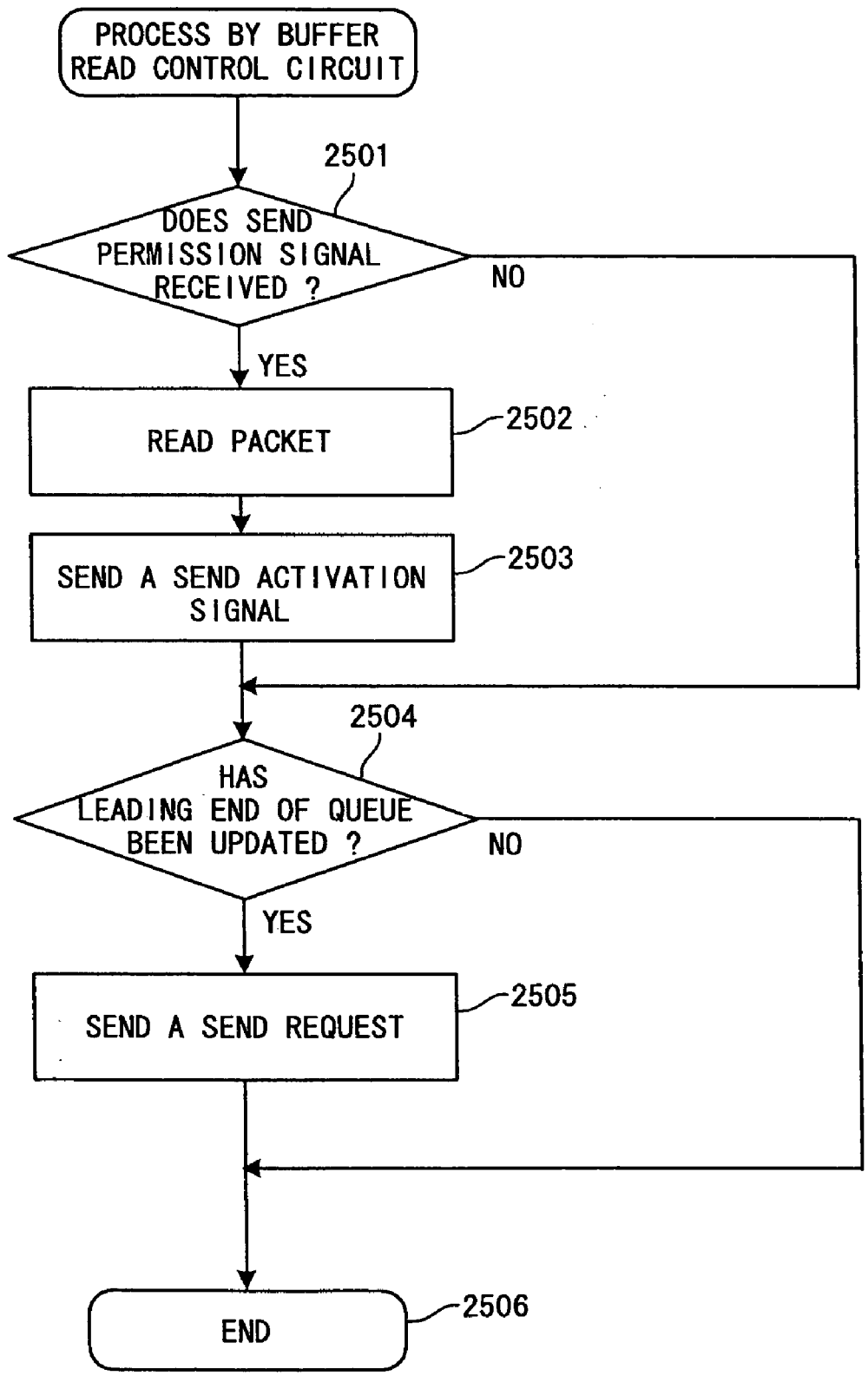
FIG. 17 is a flowchart of a process performed by a buffer read control circuit of the first embodiment of this invention.

FIG. 17 is a flowchart of a process performed by the buffer read control circuit 2004 of the first embodiment of this invention.

First, the process checks whether a send permission signal 523 is received from the sending queue selecting unit 2103 (2501).

When a send permission signal 523 is received, a packet is read from a virtual queue in the bandwidth control queue buffer 2003 or from the non bandwidth control queue buffer 2002 (queue) on the basis of the send permission signal 523 (2502). More specifically, the packet buffer address is extracted from the send permission signal 523. Next, the packet is read from the queue that corresponds to the extracted packet buffer address.

Then, the packet is sent to the route search circuit 405.

Next, after the packet is sent, a send activation signal 525 is sent to the sending queue selecting unit 2103 (2503). The send activation signal 525 is a signal for requesting the send permission signal 523.

On the other hand, in the step 2501, when no send permission signal 523 is received, the process moves directly to the step 2504.

Next, the process checks whether the leading end of any queue has been updated (2504). When the leading end of a queue is updated, it means that a packet is put in a vacant queue or that the leading packet in a queue holding a plurality of packets has been read.

When the leading end of a queue has been updated, the bandwidth control flag 1003, user ID number 1004, and request data length 1005 are extracted from the leading packet held in the updated queue. Next, the packet buffer address of the updated queue is obtained from the packet buffer address memory 2005. Next, the extracted bandwidth control flag 1003, user ID number 1004, request data length 1005, and the obtained packet buffer addresses are put together to form a send request 524. Then, the send request 524 is sent to the sending queue selecting unit 2103 (2505), and the process ends (2506).

On the other hand, in the step 2504, when no updated queue is found, the process directly ends (2506).

Figure 18:
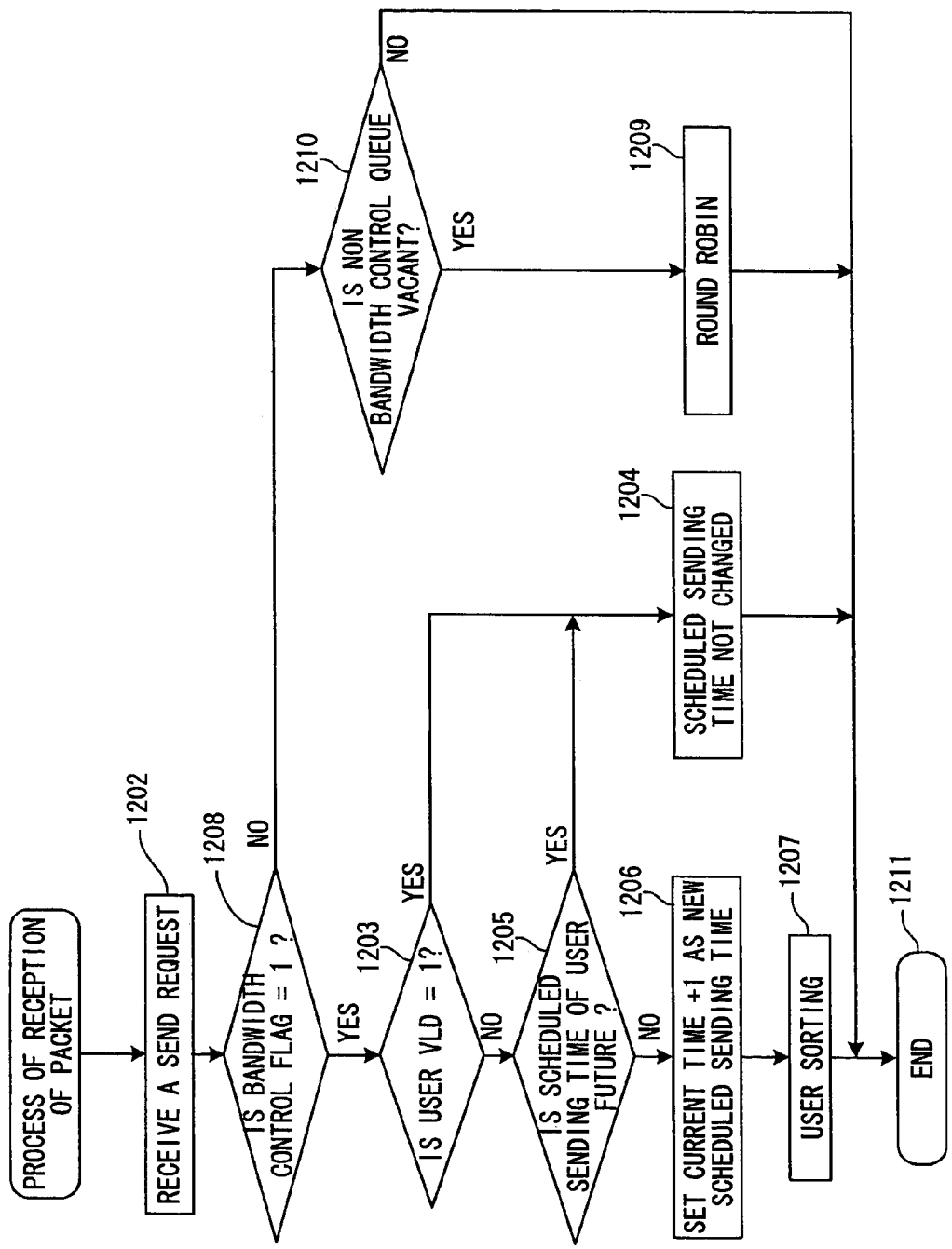
FIG. 18 is a flowchart of a process that a packet scheduling unit of the first embodiment of this invention performs when receiving a packet.

FIG. 18 is a flowchart of a process that the packet scheduling unit 510 of the first embodiment of this invention performs when a packet is received.

First, the request assigning unit 2101 in the packet sending queue determiner unit 511 receives a send request 524 from the buffer read control circuit 2004 (1202).

Receiving the send request 524, the request assigning unit 2101 checks whether "1" is stored in the bandwidth control flag 1003 in the send request 524 (1208).

When "1" is stored in the bandwidth control flag, the request assigning unit 2101 stores the send request 524 in the bandwidth control queue in the send request queue 2102 that corresponds to the user ID number 1004. Also, the request assigning unit 2101 sends the user ID number 1004 and request data length 1005 of the stored send request 524 to the binary-tree sort circuit 512 and the sending time calculating unit 2104.

The sending time calculating unit 2104 receives the user ID number 1004 and the request data length 1005. Then the sending time calculating unit 2104 reads from the user sorting information memory 514 the user sorting information about the received user ID number 1004. The user sorting information contains the scheduled sending time 1101 and the VLD 1102. The sending time calculating unit 2104 checks whether the VLD 1102 in the read sorting information is "1" or not (1203).

When the VLD 1102 is "1", the sending time calculating unit 2104 ends the process (1211) without changing the scheduled sending time 1101 (1204). This is because changing the scheduled sending time 1101 when the VLD 1102 is "1" makes it impossible to conform to the contracted bandwidth.

On the other hand, when the VLD 1102 is "0", the sending time calculating unit 2104 checks whether the read scheduled sending time 1101 is in the future or not (1205).

When the VLD 1101 is in the future, the sending time calculating unit 2104 ends the process (1211) without changing the scheduled sending time 1101 (1204). This is because changing the scheduled sending time 1101 when the VLD 1101 is in the future makes it impossible to conform to the contracted bandwidth.

When the scheduled sending time 1101 is not in the future, the sending time calculating unit 2104 updates the scheduled sending time 1101 (1206). The updated new scheduled sending time is calculated according to equation (2) below:

$$\text{New scheduled sending time} = \text{current time} + 1 \quad (2)$$

Calculating the new scheduled time in this way allows the packet to be sent immediately.

Next, the sending time calculating unit 2104 changes the VLD to "1". Then the user ID number 1004, the new scheduled sending time, and the VLD are sent to the binary-tree sort circuit 512.

The binary-tree sort circuit 512 receives the user ID number 1004, new scheduled sending time, and VLD. Then, the binary-tree sort circuit 512 stores the new scheduled sending time and the VLD in the entry that corresponds to the user ID number 1004 in the user sorting memory 514. The binary-tree sort circuit 512 then performs user sorting (1207) to determine a user that sends the packet earliest (a tentative send user) and ends the process.

On the other hand, in the step 1208, when "1" is not stored in the bandwidth control flag, the request assigning unit 2101 stores the send request 524 in the non bandwidth control queue in the send request queue 2102 that corresponds to the user ID number 1004.

Next, the send request queue 2102 checks whether the non bandwidth control queue was vacant before the send request 524 is stored (1210).

When the non bandwidth control queue was vacant, the send request queue 2102 sends a scheduling request to the sending queue selecting unit 2103.

Receiving the scheduling request, the sending queue selecting unit 2103 selects one of non bandwidth control queues that contain send requests 524 by using the round robin algorithm (1209). Then the sending queue selecting unit 2103 determines the send request 524 held in the leading end of the selected non bandwidth control queue to be a tentative send request.

When the sending queue selecting unit 2103 receives a send activation signal 525 when not receiving a send request select signal from the sending time calculating unit 2104, the sending queue selecting unit 2103 sends the tentative send request as a packet send permission 523.

On the other hand, when the step 1210 judges that the non bandwidth control queue was not vacant, the process directly ends (1211). This is because, in this case, the number of non bandwidth control queues that contain send requests 524 is not changed and so there is no need to change the tentative send request.

Figure 19:
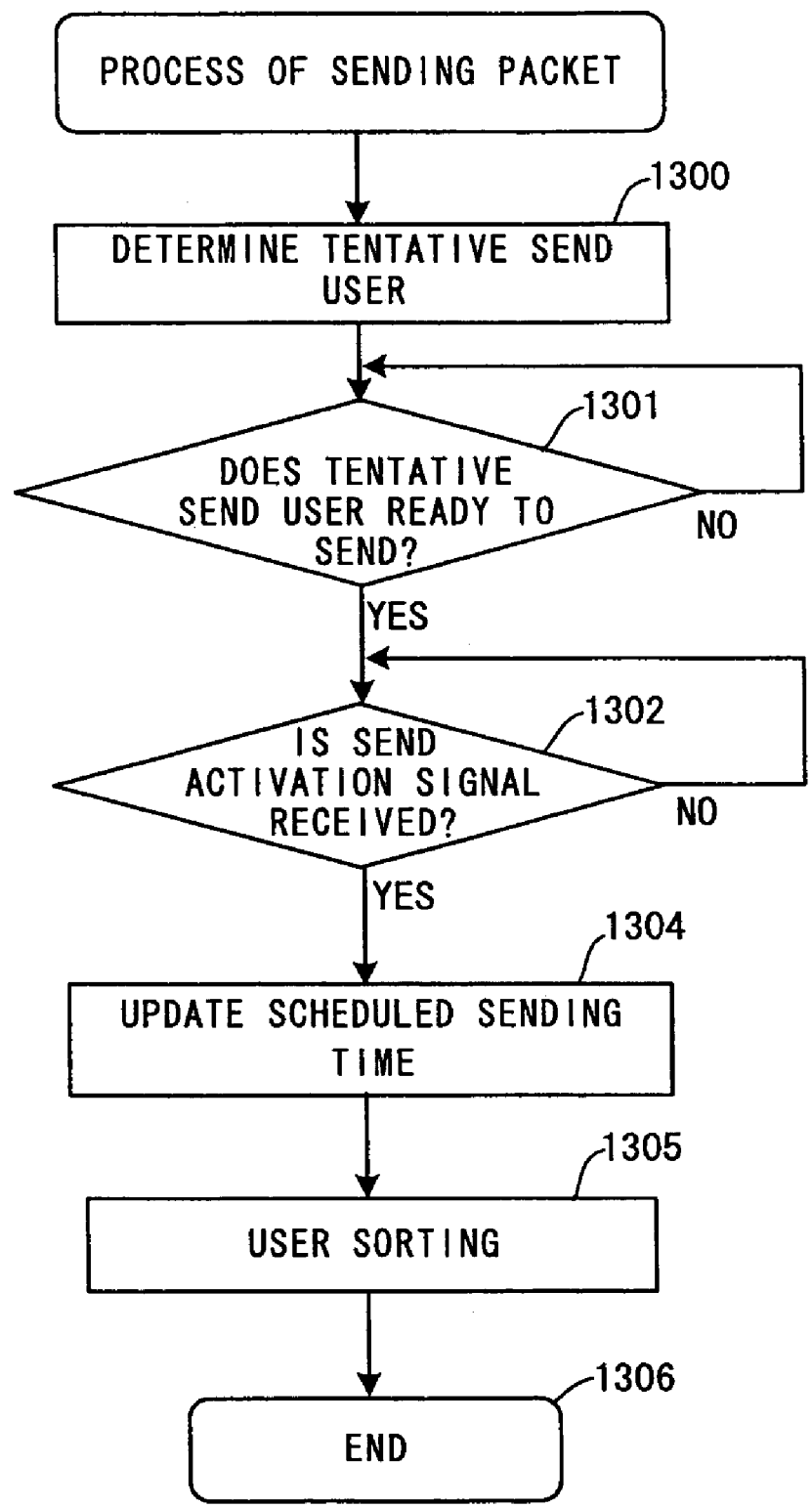
FIG. 19 is a flowchart of a process that the packet scheduling unit of the first embodiment of this invention performs when sending a packet.

FIG. 19 is a flowchart of a process that the packet scheduling unit 510 of the first embodiment of this invention performs when sending a packet.

First, the sending time calculating unit 2104 checks whether the tentative send user is in a ready-to-send state (1301). The ready-to-send state means that the scheduled sending time of the tentative send user is in the past or at the current time.

When the tentative send user is not in the ready-to-send state, the sending time calculating unit 2104 waits until the tentative send user comes in the ready-to-send state as the scheduled sending time is changed or time elapses.

On the other hand, when the tentative send user is in the ready-to-send state, the sending time calculating unit 2104 sends a send request select signal to the sending queue selecting unit 2103. The send request select signal contains the user ID number of the tentative send user.

The sending queue selecting unit. 2103 receives the send request select signal. Next, the sending queue selecting unit 2103 extracts the user ID number from the received send request select signal. Next, the sending queue selecting unit 2103 reads the send request 524 from the bandwidth control queue that corresponds to the extracted user ID number. Next, the sending queue selecting unit 2103 extracts the user ID number 1004 and the request data length 1005 from that send request 524.

Next, the sending queue selecting unit 2103 checks and obtains presence/absence of a send request 524 from that bandwidth control queue. Next, the sending queue selecting unit 2103 sends to the sending time calculating unit 2104 the extracted user ID number 1004 and request data length 1005 and the presence/absence of a send request 524. The sending time calculating unit 2104 receives the information.

Next, the sending queue selecting unit 2103 checks whether a send activation signal 525 is received from the buffer read control circuit 2004 (1302).

When not receiving a send activation signal 525, the sending queue selecting unit 2103 waits until it receives a send activation signal 525.

On the other hand, when receiving a send activation signal 525, the sending queue selecting unit 2103 sends the read send request 524 as a send permission signal 523 to the buffer read control circuit 2004.

Next, the sending time calculating unit 2104, receiving the user ID number 1004, request data length 1005, and presence/absence of a send request 524, calculates a new scheduled sending time (1304). The new scheduled sending time is obtained, for example, according to equation (3) below, with a time interval for sending 1 byte of data:

$$\text{New scheduled sending time} = \text{current scheduled sending time} + \text{the time interval} \times \text{the number of bytes of the request data length} \quad (3)$$

Alternatively, the new scheduled sending time may be obtained according to the Continuous State Leaky Bucket Algorithm described in Chapter 4. 4. 2 in The ATM Forum Specification version 4.0, so that the conformance checking by the algorithm judges each user bandwidth as "conformance". The Leaky Bucket Algorithm will be described later referring to FIG. 20.

The sending time calculating unit 2104 sends the obtained new scheduled sending time, the received presence/absence of send request 524, and user ID number 1004 to the binary-tree sort circuit 512.

Receiving the new scheduled sending time, the presence/absence of send request 524, and the user ID number 1004, the binary-tree sort circuit 512 stores these pieces of information in the user sorting information memory 514. Then the binary-tree sort circuit 512 performs user sorting (1305) to determine a user that sends the packet earliest (a tentative send user) and ends the process (1306).

Figure 20:
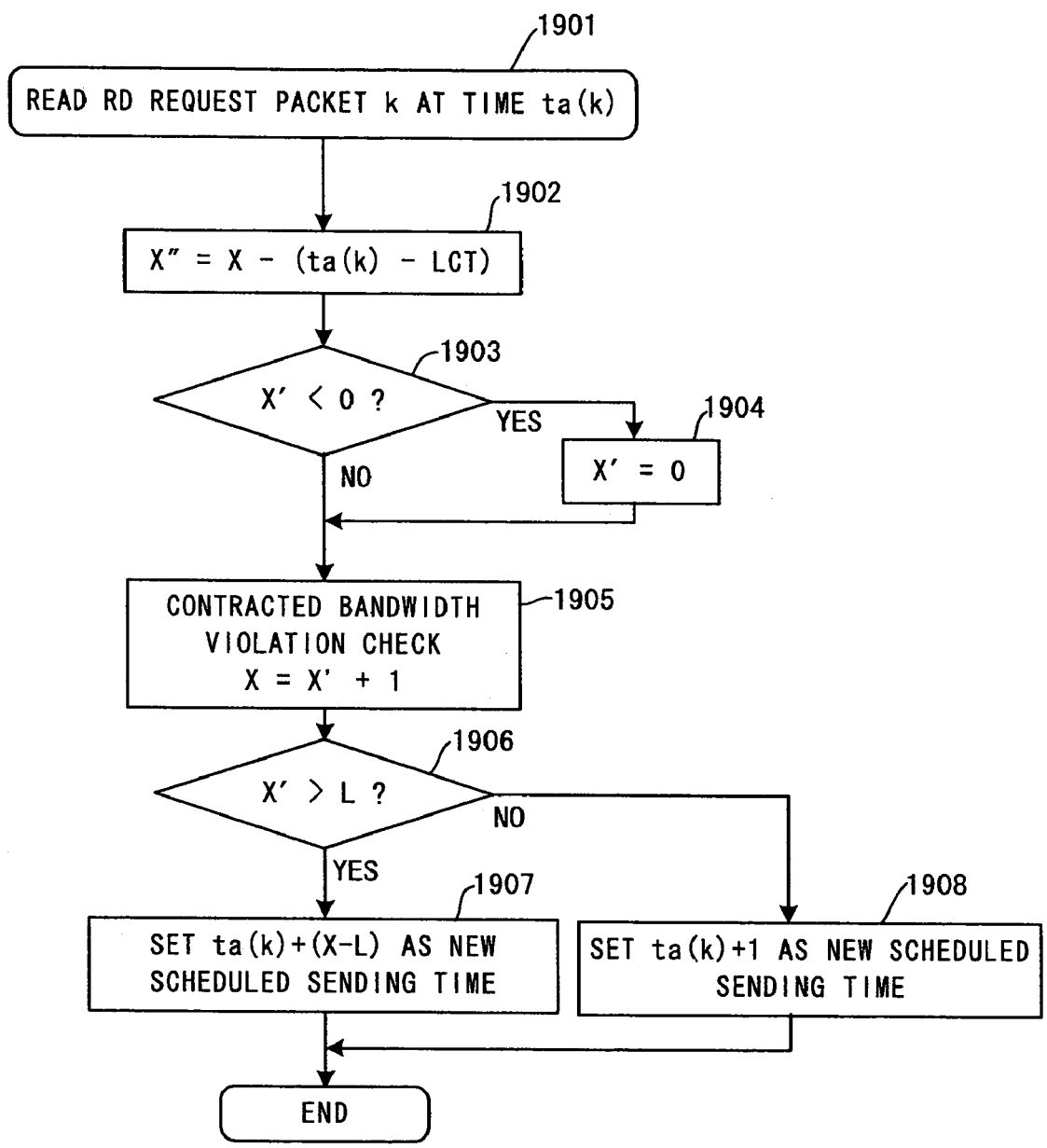
FIG. 20 is a flowchart of a process that a sending time calculating unit of the first embodiment of this invention performs to obtain a new scheduled sending time using a leaky bucket algorithm.

FIG. 20 is a flowchart of a process that the sending time calculating unit 2104 of the first embodiment of this invention performs to obtain a new scheduled sending time using the leaky bucket algorithm.

The leaky bucket algorithm is represented as a given-capacity bucket having a leaking hole. The hole of the bucket leaks a given amount of water. In the process of obtaining a scheduled sending time, this given amount corresponds to the contacted bandwidth of the user.

When an RD request is read, a certain amount of water, corresponding to the request data length of the RD request, is poured into the bucket. The bucket has a capacity that can hold water of an amount based on the contracted bandwidth. In other words, the leaky bucket algorithm judges that the data transfer conforms to the contracted bandwidth while water does not overflow the bucket. However, the algorithm judges that the data transfer exceeds the contracted bandwidth when water overflows the bucket.

Now a process of obtaining a sending time is specifically described.

AN RD request packet k is read at time ta(k) (1901).

Next, equation (4) below is calculated (1902).

$$X' = X - (ta(k) - LCT) \quad (4)$$

Where LCT is the time at which an RD request was read last time. (ta(k)−LCT) corresponds to the amount of water that leaks from the bucket. X corresponds to the water level in the bucket at the end of the reading of the last RD request. Therefore the obtained X' corresponds to the current water level in the bucket.

Next, whether X' is negative is checked (1903). When X' is not negative, the flow moves directly to the step 1905.

When X' is negative, X' is varied to 0 (1904).

Next, equation (5) below is calculated (1905).

$$X = X' + I \quad (5)$$

Where I is the amount of the RD data, which corresponds to the amount of added water. X corresponds to the water level in the bucket at the end of the reading of the RD request.

Next, whether X>L is checked (1906). L corresponds to the capacity of the bucket.

When X>L, the new scheduled sending time is obtained by equation (6) below (1907):

$$\text{New scheduled sending time} = ta(k) + (X - L) \quad (6)$$

Immediately sending the RD request when X>L causes the storage 105 to send RD data exceeding the contracted bandwidth. Accordingly, the new scheduled sending time is obtained by equation (6) so that the amount of water leaking from the bucket coincides with the amount of water added to the bucket, so as to prevent excessive data transmission over the contracted bandwidth.

When $X \leq L$, the new scheduled sending time is obtained by equation (7) below (1908):

$$\text{New scheduled sending time} = ta(k) + 1 \quad (7)$$

When $X \leq L$, the contracted bandwidth is not exceeded even when the RD request is read immediately. Therefore the new scheduled sending time is set at a time immediately after the current time ta(k) at which the RD request is read.

In this way, the new scheduled sending time can be obtained according to the leaky bucket algorithm. The sending time calculating unit 2104 can obtain a new scheduled sending time for an R2T in the same way as in the RD request.

The packet transfer device 104 of the first embodiment of this invention is capable of controlling a bandwidth without holding RD data and WR data in the packet buffer 502. This allows reduction of buffer size in the packet transfer device 104.

Also, the packet transfer device 104 times the transfer of RD requests and R2Ts so as not to exceed the contracted bandwidth of the user. This prevents the storage devices 105 and user terminals 100 from sending excessive data and thus allows efficient use of data transfer resources.

Conventional packet transfer devices had to be placed on the user side and on the storage side in order to control RD and WR data bandwidths. However, according to the first embodiment of this invention, a single packet transfer device 104 can control RD and WR data bandwidths.

The storage devices 105, including the packet transfer device 104 inside, can serve as a disk array control device having a bandwidth control IF.

Second Embodiment

According to a packet transfer device 104 of a second embodiment, a plurality of network interfaces can be incorporated in a chassis-type switch.

Figure 21:
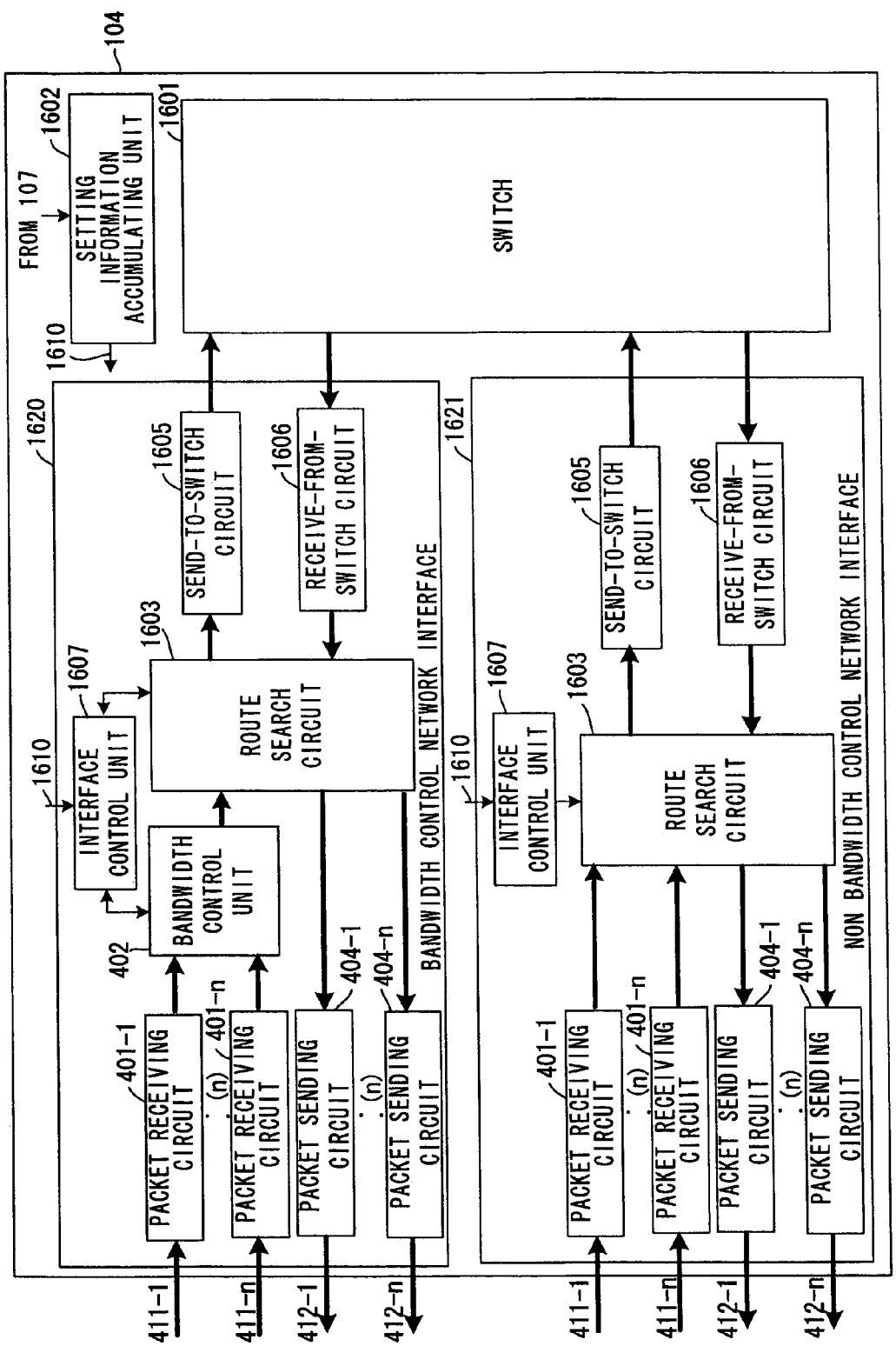
FIG. 21 is a block diagram of a packet transfer device according to a second embodiment of this invention.

FIG. 21 shows the packet transfer device 104 of the second embodiment of this invention.

The packet transfer device 104 of the second embodiment includes a bandwidth control network interface 1620, a non bandwidth control network interface 1621, a switch unit 1601, and a setting information accumulating unit 1602.

The switch 1601 extracts the output network number 1002 from the internal header 1000 of a received packet. Then the switch 1601 transfers the packet to the bandwidth control network interface 1620 or the non bandwidth control network interface 1621 that has the output network 412 of the extracted output network number 1002.

The setting information accumulating unit 1602 accumulates information used by interface control units 1607.

The bandwidth control network interface 1620 routes packets while controlling bandwidths. The non bandwidth control network interface 1621 routes packets without controlling bandwidths.

The bandwidth control network interface 1620 includes input networks 411, packet receiving circuits 401, a bandwidth control unit 402, a route search circuit 1603, packet sending circuits 404, output networks 412, the interface control unit 1607, a send-to-switch circuit 1605, and a receive-from-switch circuit 1606. The input networks 411, packet receiving circuits 401, bandwidth control unit 402, packet sending circuits 404, and output networks 412 are configured and operate as described in the first embodiment. The same components as those of the first embodiment are shown at the same reference numerals and not described again here.

The send-to-switch circuit 1605 transfers packets received from the route search circuit 1603 to the switch unit 1061. The receive-from-switch circuit 1606 transfers packets received from the switch unit 1061 to the route search circuit 1603.

The interface control unit 1607 sets various pieces of information in the bandwidth control unit 402 and the route search circuit 1603. The various pieces of information includes information about the contracted bandwidth of the user site 108, packet route search information, and net mask information about the user site 108. The interface control unit 1607 obtains these pieces of information from the setting information accumulating unit 1602 (1610).

The route search circuit 1603 searches for routes of received packets. Specifically, when receiving a packet, the route search circuit 1603 extracts the destination IP address 604 of the packet. Next, the route search circuit 1603 searches a route search table to find the output network 412 through which the packet with the extracted destination IP address 604 is to be sent. Next, the route search circuit 1603 stores the number of this output network 412 in the output network number 1002 of the internal header 1000. Next, when this output network 412 is on the non bandwidth control network interface 1621, the route search circuit 1603 sends the packet to the send-to-switch circuit 1605. On the other hand, when the found output network 412 is on the bandwidth control network interface 1620, the route search circuit 1603 sends the packet to the packet sending circuit 404 connected to this output network 412.

The non bandwidth control network interface 1621 has the same structure as the bandwidth control network interface 1620 except that the bandwidth control unit 402 is removed, and so the non bandwidth control network interface 1621 is not described in detail here. The packet receiving circuits 401 and the route search circuit 1603 are therefore connected directly.

While FIG. 21 shows a single bandwidth control network interface 1620 and a single non bandwidth control network interface 1621, a plurality of interfaces 1620 and 1621 may be provided.

According to the second embodiment, it is possible to provide bandwidth control of storage data with network interfaces in a chassis-type switch having good extensibility.

Third Embodiment

A third embodiment of this invention provides traffic shaping units in the LAN switch 101 and in the packet transfer device 104. The third embodiment is applicable to both of the first and second embodiments. An application to the second embodiment is now described.

Figure 22:
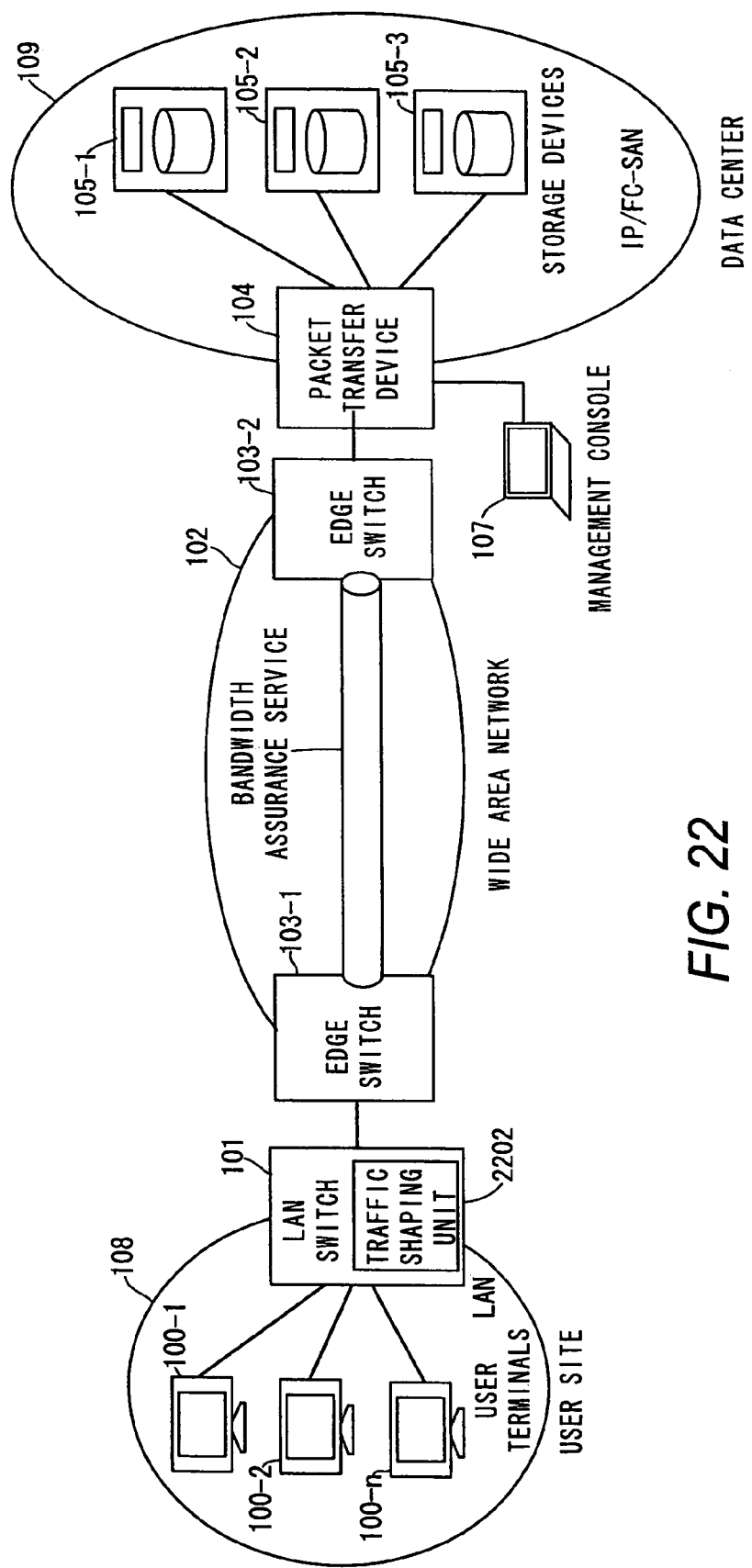
FIG. 22 is a block diagram of a storage-centric network system according to a third embodiment of this invention.

FIG. 22 is a block diagram of a storage-centric network system according to the third embodiment of this invention.

The storage-centric network system of the third embodiment includes a traffic shaping unit 2202 in the LAN switch 101. In other respects, the configuration is the same as that of the second embodiment. However, the configuration of the storage-centric network system of the second embodiment is the same as that of the first embodiment (FIG. 1) except for the configuration of the packet transfer device 104.

The traffic shaping unit 2202 has a traffic shaping function to control bandwidths of all packets transferred through the wide area network 102 (refer to the first patent document, for example).

Figure 23:
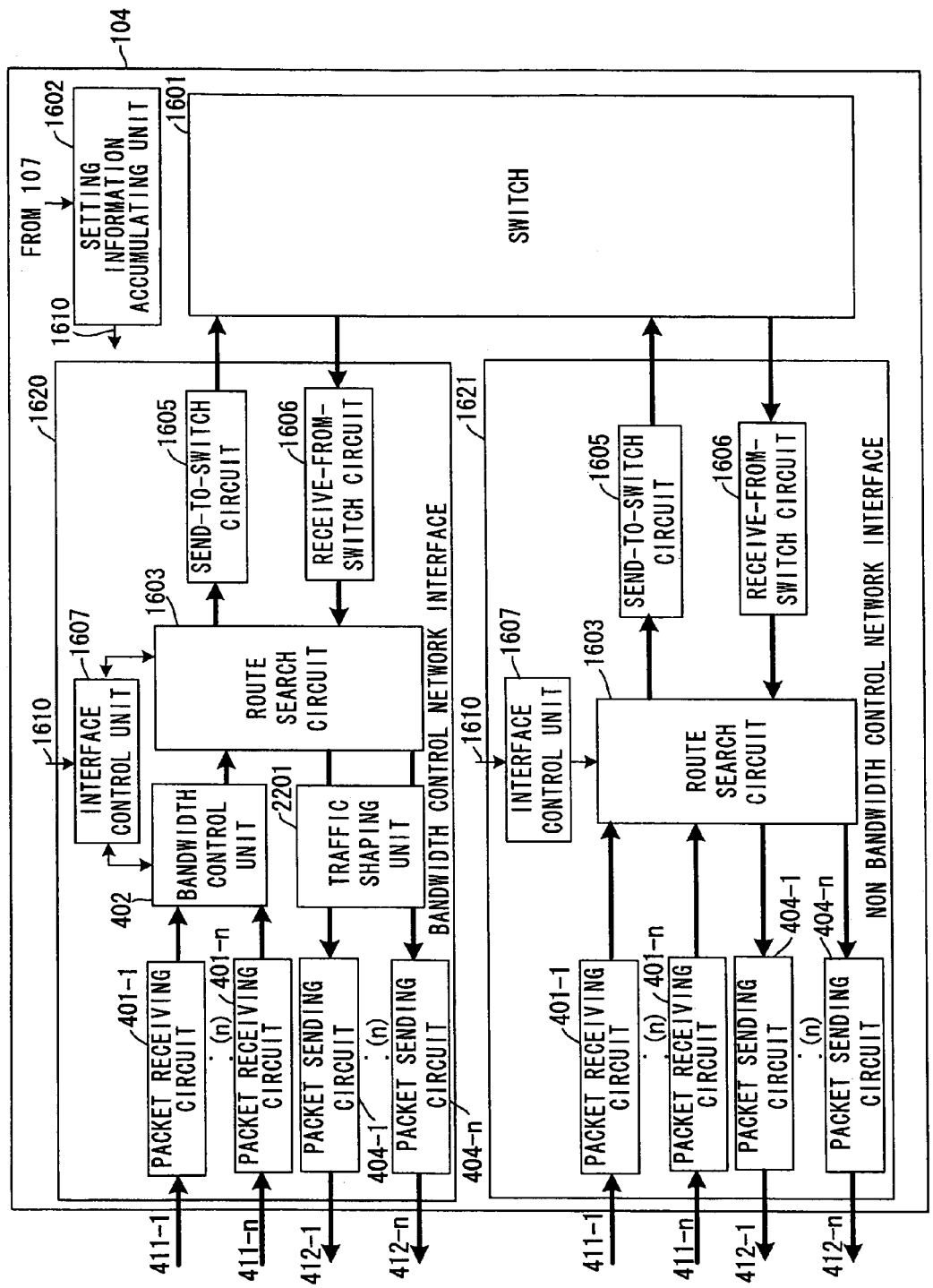
FIG. 23 is a block diagram showing a packet transfer device of the third embodiment of this invention.
Figure 24:
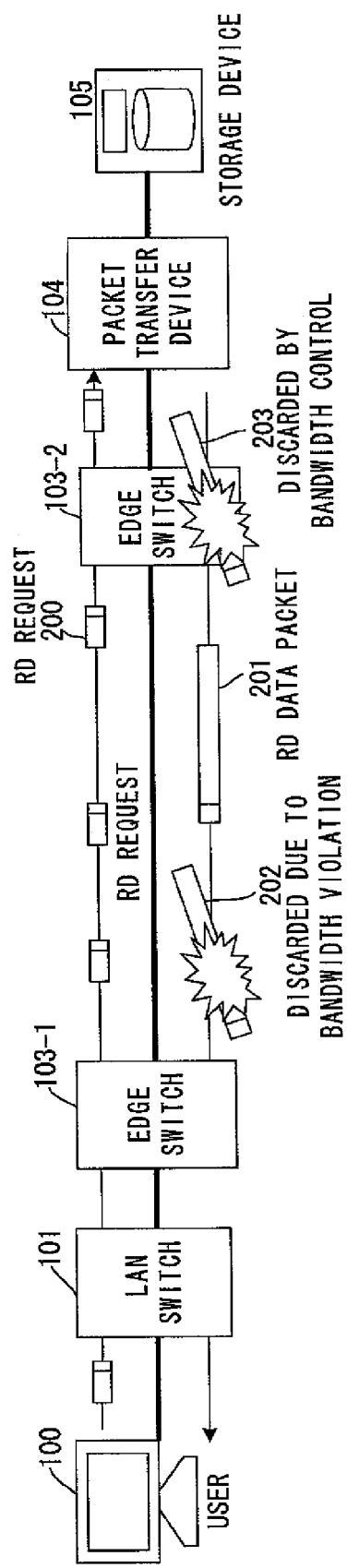
FIG. 24 is an explanatory diagram illustrating a read process in a conventional storage-centric network system.
Figure 25:
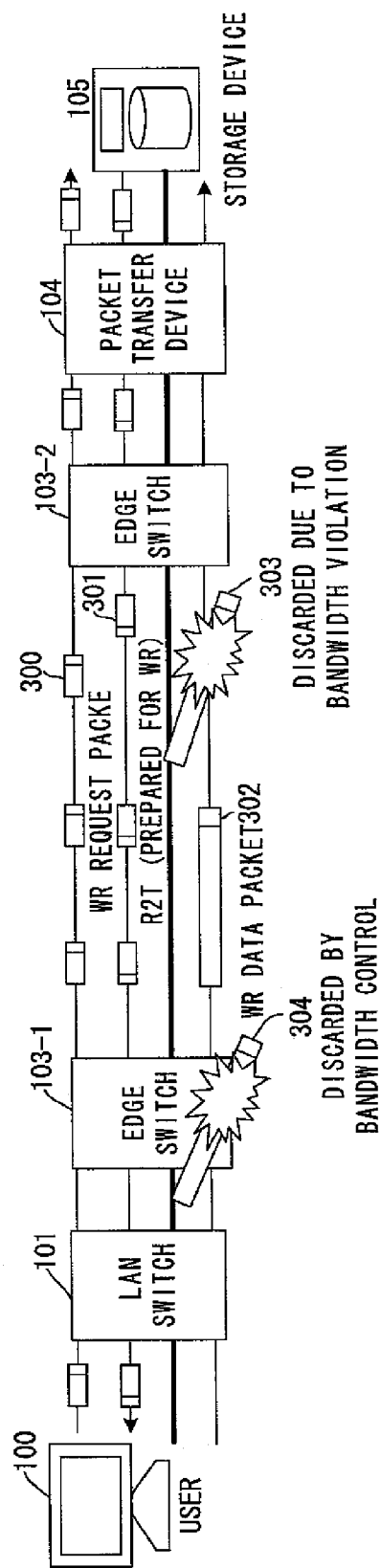
FIG. 25 is an explanatory diagram illustrating a write process in the conventional storage-centric network system.

FIG. 23 is a block diagram of the packet transfer device 104 of the third embodiment of this invention.

The packet transfer device 104 of the third embodiment includes a traffic shaping unit 2201 between the route search circuit 1603 and the packet sending circuits 404 in the bandwidth control network interface 1620. In other respects, this configuration is the same as that of the packet transfer device 104 of the second embodiment. The same components as those of the second embodiment are shown at the same reference numerals and not described again here.

The traffic shaping unit 2201 has a traffic shaping function to control bandwidths of all packets transferred through the wide area network.

When the third embodiment is applied to the packet transfer device 104 of the first embodiment, the traffic shaping unit 2201 is provided between the route search circuit 403 and the packet sending circuits 404.

The data transfer device 104 of the first or second embodiment controls the amount of transferred RD and WR data by controlling intervals at which RD requests and R2Ts are transferred. However, when RD data or WR data is divided and transferred in a plurality of IP packets, the data transfer device 104 is unable to control intervals of transfer of the separate IP packets.

The edge switches 103, using UPC, monitor the amount of data transferred through the wide area network. The UPC monitors the amount of packets flowing into the wide area network per unit time to see whether the traffic is within the contracted bandwidth. The unit monitor time may be set short.

In this case, even when the data transfer device 104 of the first or second embodiment transfers RD requests or R2Ts while intending to conform to the contracted bandwidth, the edge switches 103 may judge from the traffic per unit time that the contracted bandwidth is exceeded. The edge switches 103 then discard the excessive packets.

This can be effectively prevented by providing the storage-centric network system with the traffic shaping units 2201, 2202.

However, as mentioned earlier, simply providing the traffic shaping units 2201, 2202 may allow overflow of the packet buffer.

Accordingly, the third embodiment uses the data transfer device 104 of the first or second embodiment in combination with the traffic shaping units 2201, 2202 to prevent packets from being discarded even when the unit monitor time is set short.

Since the data transfer device 104 transfers RD requests and R2Ts while controlling transmission intervals, the packet buffers in the traffic shaping units 2201, 2202 do not overflow.

The traffic shaping unit 2201 may be provided as a separate device external to the packet transfer device 104. Also, the traffic control unit 2202 may be provided as a separate device external to the LAN switch 101.

While the present invention has been described in detail and pictorially in the accompanying drawings, the present invention is not limited to such detail but covers various obvious modifications and equivalent arrangements, which fall within the purview of the appended claims.

What is claimed is:

1. A packet transfer apparatus connected to a first device and a second device, with a network therebetween, comprising:
    an input unit that receives at least one packet from the first device;
    a packet storage unit that stores the packet;
    a packet processing unit that stores the packet in the packet storage unit;
    a packet checking unit that checks whether the packet comprises a data request packet sent from the first device to the second device;
    a packet analyzing unit that analyzes an amount of data requested to be transmitted from the second device to the first device, corresponding to the packet which is the data request packet, and wherein said packet analyzing unit sets "0" as an amount of data requested to be transmitted from the second device to the first device corresponding to packets received by the input unit which are determined by the packet checking unit not to be data request packets sent from the first device to the second device,
    a transfer control unit that controls transfer of the at least one packet on the basis of the analyzed amount of data; and
    an output unit that sends the packets received by the input unit to the second device, with the packets which are determined not to be data request packets sent from the first device to the second device being sent with the amount of data requested set to "0",
    wherein the packet storage unit includes:
    a bandwidth control packet storage unit for storing the received packet judged by the packet checking unit that includes a data request packet sent from the first device to the second device; and
    a non-bandwidth control packet storage unit for storing the received packet judged by the packet checking unit that does not include a data request packet sent from the first device to the second device.

2. The packet transfer apparatus according to claim 1, wherein the packet checking unit checks whether or not the packet is a packet sent from the first device to the second device, and the packet checking unit further checks whether the packet is a packet related to data request when the packet is sent from the first device to the second device.

3. The packet transfer apparatus according to claim 2, wherein the packet checking unit judges that the packet is related to data transmission when the packet is a packet by which the first device requests data transmission from the second device.

4. The packet transfer apparatus according to claim 2, wherein the packet checking unit judges that the packet is related to data request when the packet is a send permission packet by which the first device permits data transmission from the second device.

5. The packet transfer apparatus according to claim 2, wherein, among packets sent from the first device to the second device, the packet processing unit stores both of a packet related to the data request and a packet not related to the data request in a same area of the packet storage unit, and the packet processing unit stores a packet sent from the first device to a device other than the second device in another area of the packet storage unit.

6. The packet transfer apparatus according to claim 1, wherein, the transfer control unit calculates a time for sending the packet on the basis of the amount of data analyzed by the packet analyzing unit when the packet is related to the data request, and the transfer control unit reads the packet from the packet storage unit and sends the packet to the output unit when the calculated sending time comes.

7. The packet transfer apparatus according to claim 1, wherein, the transfer control unit calculates a time for sending the packet on the basis of the amount of data analyzed by the packet analyzing unit when the packet is related to the data request, and the transfer control unit reads a packet not related to the data request from the packet storage unit when the calculated sending time does not come.

8. The packet transfer apparatus according to claim 7, wherein, the transfer control unit does not read the packet not related to the data request from the packet storage unit until the calculated sending time comes when a packet not related to the data request is received from the first device after receiving the packet related to the data request.

9. The packet transfer apparatus according to claim 1, further comprising a traffic shaping unit that controls an amount of data per unit time that is sent to the first device and/or the second device.

10. The packet transfer apparatus according to claim 1, wherein the first device is a user terminal;
    the second device is a storage apparatus;
    the input unit receives a packet from the user terminal;
    the packet checking unit checks whether the packet is a read request from the user terminal;
    the packet analyzing unit analyzes an amount of data to be sent requested by the read request packet;
    the transfer control unit controls transfer of the read request packet on the basis of the analyzed amount of data; and
    an output unit that sends the received read request packet to the storage apparatus.

11. The packet transfer apparatus according to claim 1, wherein
    the first device is a storage apparatus;
    the second device is a user terminal;
    the input unit receives a packet from the storage apparatus;
    the packet checking unit checks whether the packet is a ready to transfer packets from the storage apparatus;
    the packet analyzing unit analyzes an amount of data to be sent permitted by the ready to write packet;
    the transfer control unit controls transfer of the ready to transfer packet on the basis of the analyzed amount of data; and
    an output unit that sends the received ready to transfer packet to the user terminal.

12. The packet transfer apparatus according to claim 1, wherein the packet processing unit is configured to judge whether the received packet includes a data request packet sent from the first device to the second device with reference to a bandwidth control flag and to determine whether the received packet is to be stored in the bandwidth control packet storage unit or the non-bandwidth control packet storage unit.

13. A storage system including, a first packet transfer apparatus connected to a storage apparatus and a second packet transfer apparatus connected to a user terminal, the first packet transfer apparatus being connected to the second packet transfer apparatus, wherein the first packet transfer apparatus and the second packet transfer apparatus are connected through the network, wherein the first packet transfer apparatus comprises:

an input unit that receives at least one packet from the user terminal;

a packet storage unit that stores the packet;

a packet processing unit that stores the packet in the packet storage unit;

a packet checking unit that checks whether the packet is a read request from the user terminal;

a packet analyzing unit that analyzes an amount of data requested to be transmitted from the storage apparatus to the user terminal, corresponding to the packet which is the read request, from the user terminal, and wherein said packet analyzing unit sets "0" as an amount of data requested to be transmitted from a storage apparatus to the user terminal corresponding to packets received from the input unit which are determined by the packet checking unit not to be packets which are read requests from the user terminal;

a transfer control unit that controls transfer of the read request packet on the basis of the analyzed amount of data; and an output unit that sends the received read request packet to the storage apparatus and which sends packets determined not to be packets which are read requests from the user terminal with the amount of data requested set to "0", wherein the packet storage unit includes:

a bandwidth control packet storage unit for storing the received packet judged by the packet checking unit that includes a data request packet sent from the user terminal to the storage apparatus: and a non-bandwidth control packet storage unit for storing the received packet judged by the packet checking unit that does not include a data request packet sent from the user terminal to the storage apparatus.

14. The storage system according to claim 13, wherein the first packet transfer apparatus comprises a traffic shaping unit that controls an amount of data per unit time that is sent to the user terminal.

15. A storage system including, a first packet transfer apparatus connected to a storage apparatus and a second packet transfer apparatus connected to a user terminal, the first packet transfer apparatus being connected to the second packet transfer apparatus, wherein the first packet transfer apparatus and the second packet transfer apparatus are connected through the network, wherein the first packet transfer apparatus comprises:

an input unit that receives at least one packet from the storage apparatus;

a packet storage unit that stores the packet;

a packet processing unit that stores the packet in the packet storage unit;

a packet checking unit that checks whether the packet is a ready to transfer packet from the storage apparatus;

a packets analyzing unit that analyzes an amount of data requested to be transmitted from the storage apparatus to the user terminal, corresponding to the packet which is the ready to transfer packet, and wherein said packet analyzing unit sets "0" as an amount of data requested to be transmitted from the storage apparatus to the user terminal corresponding to packets received by the input unit which are determined by the packet checking unit not to be packets which are ready to transfer packets; a transfer control unit that controls transfer of the ready to transfer packet on the basis of the analyzed amount of data; and an output unit that sends the received ready to transfer packet to the user terminal and sends packets determined not to be ready to transfer packets with the amount of data requested set to "0", wherein the packet storage unit includes:

a bandwidth control packet storage unit for storing the received packet judged by the packet checking unit that includes a data request packet sent from the user terminal to the storage apparatus; and a non-bandwidth control packet storage unit for storing the received packet judged by the packet checking unit that does not include a data request packet sent from the user terminal to the storage apparatus.

16. The storage system according to claim 15, wherein the second packet transfer apparatus comprises a traffic shaping unit that controls an amount of data per unit time that is sent to the storage apparatus.

* * * * *